United States Patent
Bae et al.

(10) Patent No.: US 9,581,862 B2
(45) Date of Patent: Feb. 28, 2017

(54) LIQUID CRYSTAL DISPLAY DEVICE AND MANUFACTURING METHOD THEREOF

(71) Applicant: Samsung Display Co., Ltd., Yongin, Gyeonggi-Do (KR)

(72) Inventors: Kwang Soo Bae, Yongin-si (KR); Yeun Tae Kim, Hwaseong-si (KR); Hae Ju Yun, Hwaseong-si (KR); Yong Seok Kim, Seoul (KR); Dae Ho Song, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/660,727

(22) Filed: Mar. 17, 2015

(65) Prior Publication Data

US 2016/0103377 A1   Apr. 14, 2016

(30) Foreign Application Priority Data

Oct. 8, 2014  (KR) .................. 10-2014-0136004

(51) Int. Cl.
*G02F 1/1337* (2006.01)
*G02F 1/1333* (2006.01)
*G02F 1/1362* (2006.01)

(52) U.S. Cl.
CPC .. *G02F 1/133707* (2013.01); *G02F 1/133377* (2013.01); *G02F 1/13624* (2013.01)

(58) Field of Classification Search
CPC . H01L 27/1214; H01L 27/12; H01L 27/1218; H01L 27/3244; H01L 27/3246; H01L 27/326; H01L 27/3262; H01L 27/1266; H01L 27/3211; H01L 27/3241; H01L 27/3276; H01L 29/786; H01L 29/41733; H01L 21/02104; H01L 21/02107; H01L 21/02488; H01L 2251/301; H01L 2251/305; H01L 2251/308; H01L 23/5329; H01L 23/564; G02F 1/133362; G02F 1/133377; G02F 1/1341; G02F 1/1335; G02F 1/1368; G02F 1/133345; G02F 1/136286; G02F 1/134309; G02F 1/133514;

(Continued)

(56) References Cited

U.S. PATENT DOCUMENTS 7,342,633 B2 *  3/2008  Tak ................... G02F 1/133707
                                                         349/129
7,782,432 B2 *  8/2010  Wang ................ G02F 1/133707
                                                         349/129

(Continued)

FOREIGN PATENT DOCUMENTS

| KR | 10-2013-0084842 | 7/2013 |
| KR | 10-2013-0124827 | 11/2013 |
| KR | 10-2013-0131155 | 12/2013 |

*Primary Examiner* — Thoi Duong
(74) *Attorney, Agent, or Firm* — Innovation Counsel LLP

(57) ABSTRACT

A liquid crystal display according to the present inventive concept includes: a substrate; a gate line and a data line crossing each other formed on the substrate; a thin film transistor connected to the gate line and the data line; a pixel electrode connected to the thin film transistor and having a slit at a center; a liquid crystal layer filling a plurality of microcavities positioned on the pixel electrode; a common electrode positioned on the liquid crystal layer; and a roof layer formed on the common electrode and having an oblique portion formed to be inclined at both outer sides of the microcavities.

10 Claims, 37 Drawing Sheets

(58) Field of Classification Search
CPC ............. G02F 1/134336; G02F 1/1333; G02F 1/13394; G02F 1/133305; G02F 1/136; G02F 2001/134345; G02F 2001/133388; G02F 2001/134372; G02F 2001/136295; G09G 2300/0426; G09G 2300/08; G09G 3/3648; G09G 3/2074
USPC ........ 257/72, 59; 349/43, 138, 86, 139, 106, 349/12, 143, 144, 189, 33, 41, 42, 92, 349/187, 129, 146, 145; 345/103, 92
See application file for complete search history.

(56) References Cited

U.S. PATENT DOCUMENTS

| | | | |
|---|---|---|---|
| 8,059,243 B2 | 11/2011 | Kim et al. | |
| 8,169,579 B2 | 5/2012 | Kim | |
| 2012/0062448 A1* | 3/2012 | Kim | G02F 1/133377 345/55 |
| 2013/0242228 A1* | 9/2013 | Park | G02F 1/133617 349/61 |

* cited by examiner

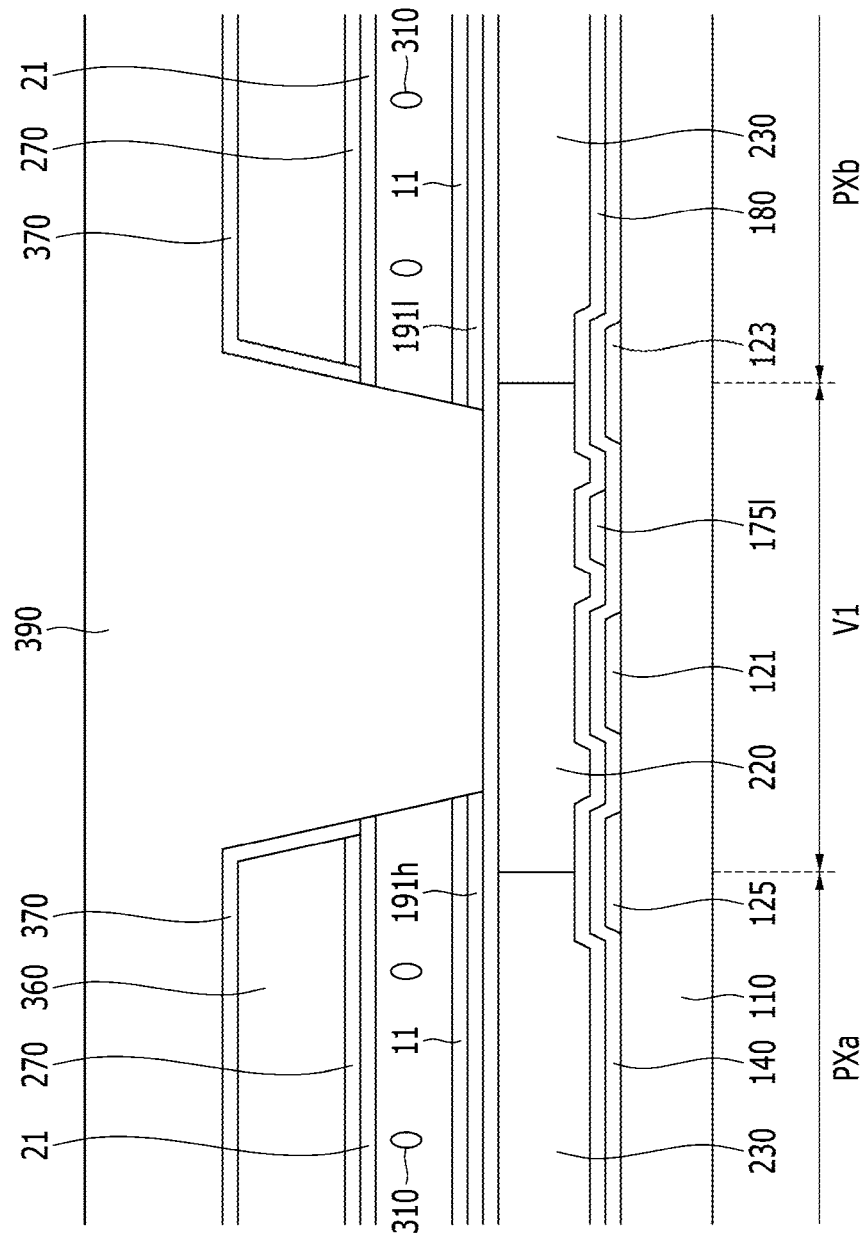

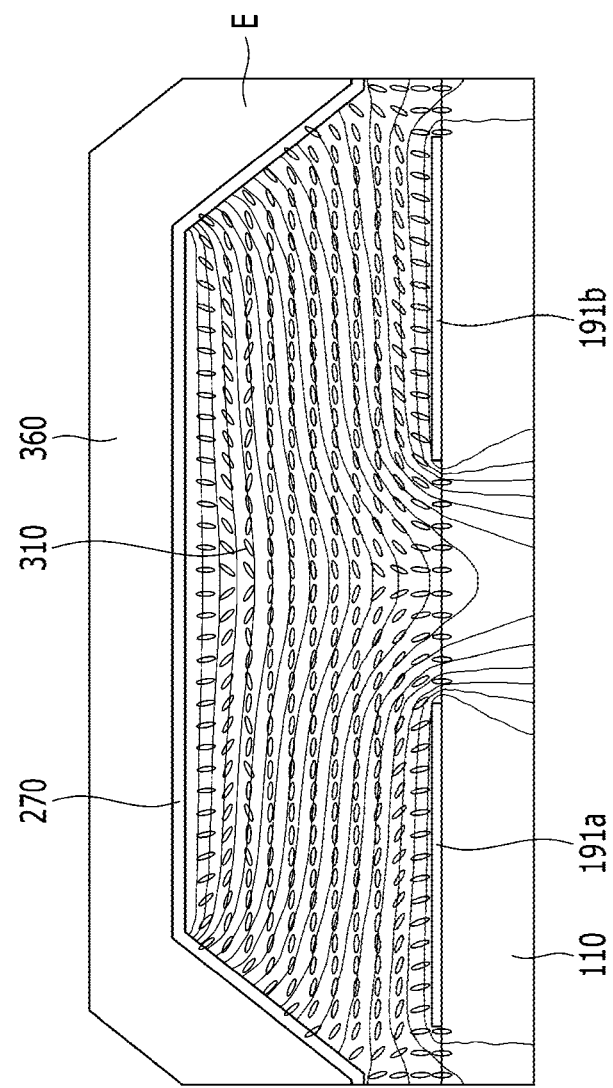

FIG. 9B
- Slit interval: 7μm
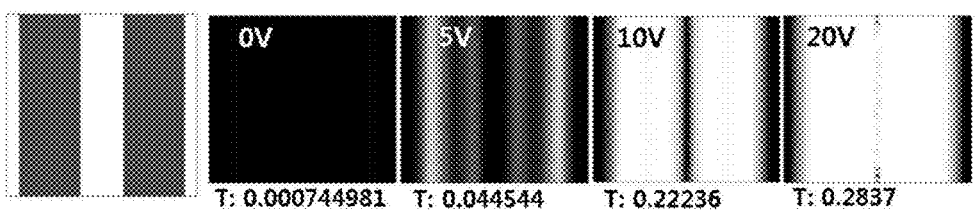
- Slit interval : 9μm
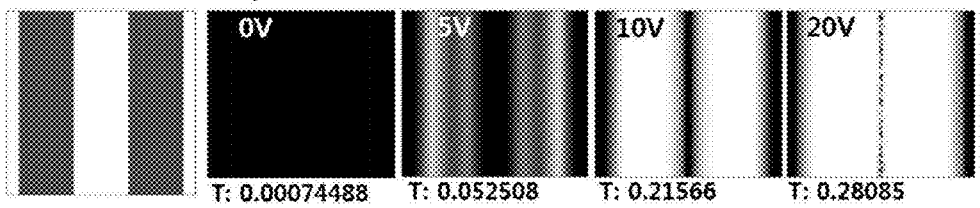
- Slit interval : 11μm
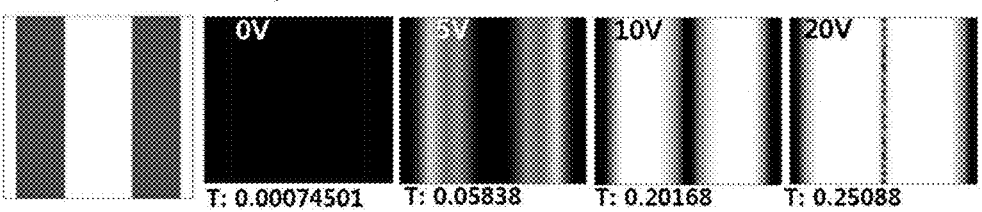

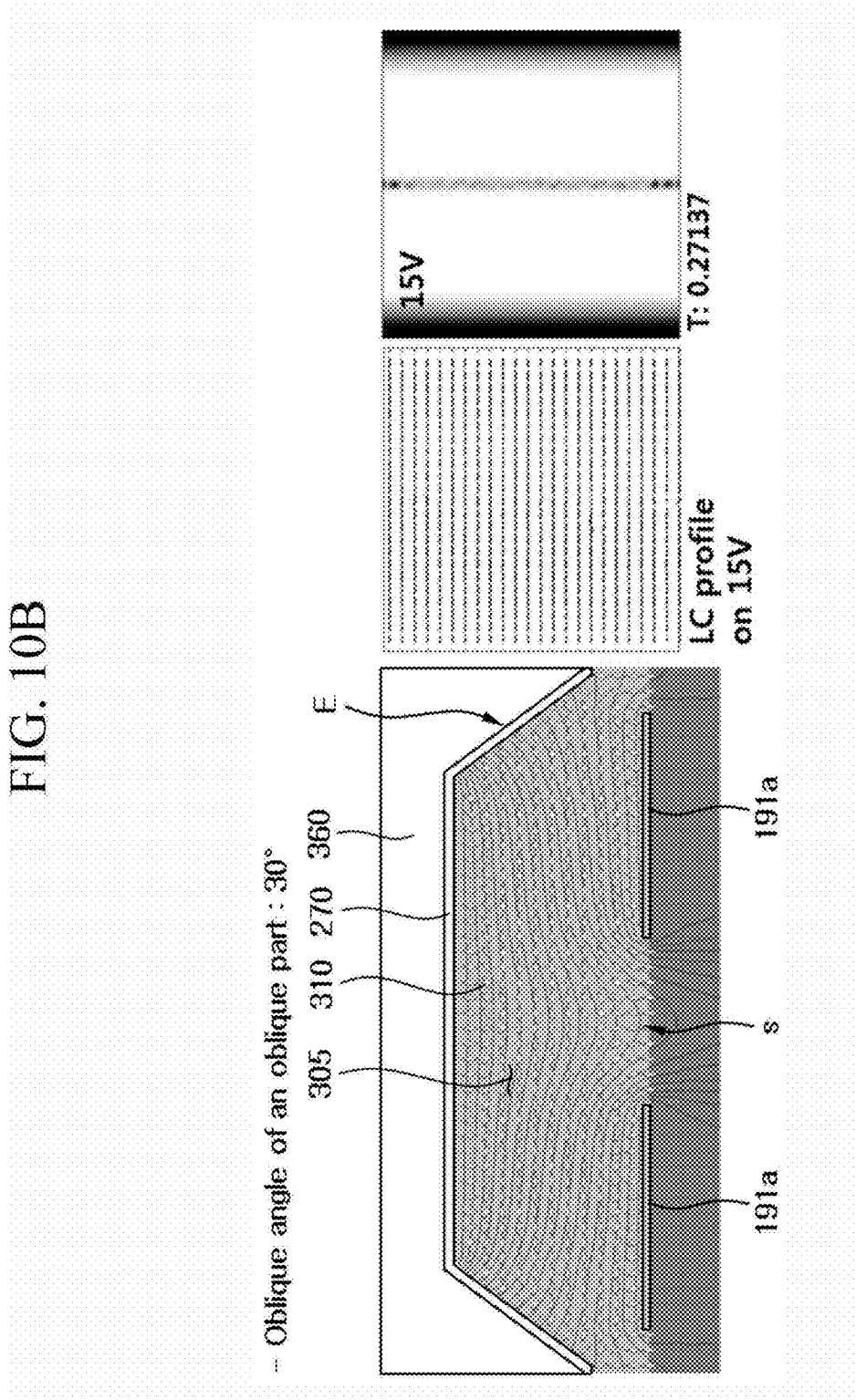

LIQUID CRYSTAL DISPLAY DEVICE AND MANUFACTURING METHOD THEREOF

CROSS-REFERENCE TO RELATED APPLICATION

This application claims priority to and the benefit of Korean Patent Application No. 10-2014-0136004 filed in the Korean Intellectual Property Office on Oct. 8, 2014, the entire contents of which are incorporated herein by reference.

BACKGROUND (a) Field

The present inventive concept relates to a liquid crystal display and a manufacturing method thereof. More particularly, the present inventive concept relates to a display device with improved transmittance and a manufacturing method thereof.

(b) Description of the Related Art

A liquid crystal display (hereinafter referred to as an LCD) is one of the most widely used flat panel displays. The LCD includes two display panels provided with electric field generating electrodes, such as pixel electrodes and a common electrode, and a liquid crystal layer interposed between the two display panels. In the LCD, voltages are applied to the electric field generating electrode to generate an electric field in the liquid crystal layer. Due to the generated electric field, liquid crystal molecules of the liquid crystal layer are aligned and polarization of incident light is controlled, thereby displaying images.

The two display panels forming the liquid crystal display may be a thin film transistor array panel and an opposing display panel. In the thin film transistor array panel, a gate line transmitting a gate signal and a data line transmitting a data signal are formed to be crossed, and a thin film transistor connected to the gate line and the data line and a pixel electrode connected to the thin film transistor may be formed. The opposing display panel may include a light blocking member, a color filter, a common electrode, etc. If necessary, the light blocking member, the color filter, and the common electrode may be formed in the thin film transistor array panel.

However, in the conventional liquid crystal display, two substrates are inevitably required, and the constituent elements are respectively formed on the two substrates such that the display device is heavy, the cost is high, and the processing time is long.

The above information disclosed in this Background section is only for enhancement of understanding of the background of the inventive concept and therefore it may contain information that does not form the prior art.

SUMMARY

The present inventive concept relates to a display device with reduced weight, thickness, cost, and processing time by manufacturing the display device by using one substrate, and a manufacturing method thereof.

Also, a display device with improved luminance and a manufacturing method thereof are provided.

A liquid crystal display according to an exemplary embodiment of the present inventive concept includes: a substrate; a gate line and a data line crossing each other formed on the substrate; a thin film transistor connected to the gate line and the data line; a pixel electrode connected to the thin film transistor and having a slit at a center; a liquid crystal layer filling a plurality of microcavities positioned on the pixel electrode; a common electrode positioned on the liquid crystal layer; and a roof layer formed on the common electrode and having an oblique portion formed to be inclined at both outer sides of the microcavities.

An oblique angle of the oblique portion may be formed in a range of 10 degrees to 80 degrees.

A width of the slit may be formed of a range of about 1 to about 11 μm.

The width of the slit may be formed of a range of about 5 μm to about 9 μm.

The oblique portion may be formed to cover right and left sides of the microcavities.

The common electrode may be formed of a plate shape parallel to the gate line to cover the right and left sides of the microcavities.

The pixel electrode may include a first electrode and a second electrode positioned at a right side and a left side with respect to the slit.

The first electrode and second electrode may extend in a direction in which the data line extends.

The first electrode and the second electrode may be connected to each other.

The first electrode and the second electrode may be formed to be connected at one side or both sides of the pixel electrode.

The pixel electrode may include a first electrode and a second electrode respectively positioned at a left side and a right side with respect to the slit, and the first and second electrodes may include a first region extending in a direction from a lower left toward an upper right and a second region extending in a direction from an upper left toward a lower right.

A manufacturing method of a liquid crystal display according to an exemplary embodiment of the present inventive concept includes: forming a thin film transistor on a substrate; forming a pixel electrode connected to the thin film transistor and including a slit at a center; forming a sacrificial layer on the pixel electrode; forming a common electrode on the sacrificial layer; forming a roof layer including an oblique portion formed to be inclined at both sides outside the microcavities on the common electrode; patterning the roof layer to expose a portion of the sacrificial layer to form a liquid crystal injection hole; removing the sacrificial layer to form microcavities between the pixel electrode and the common electrode; injecting a liquid crystal material into the microcavities through the liquid crystal injection hole to form a liquid crystal layer; and forming an overcoat roof layer to seal the microcavities.

The oblique portion may be formed to have an oblique angle of about 10 degrees to about 80 degrees.

The width of the slit may be formed in a range of about 1 μm to about 11 μm.

The width of the slit may be formed of a range of about 5 μm to about 9 μm.

The oblique portion may be formed to cover a right side and a left side of the microcavities.

The common electrode may be formed of one plate shape to cover the right side and the left side of the microcavities.

The pixel electrode may include a first electrode and a second electrode respectively positioned at a right side and a left side with respect to the slit.

The first electrode and second electrode may be connected to each other.

The first electrode and second electrode may be connected to each other at one side or both sides of the pixel electrode.

In addition to the technical object of the present inventive concept, other characteristics and advantages of the present inventive concept will be described hereinafter, and will be clearly understood by a person skilled in the art in the technical field to which the present inventive concept belongs.

The present inventive concept provides subsequent advantages.

According to the exemplary embodiments of the present inventive concept, it is possible to reduce weight, thickness, cost, and processing time by manufacturing the display device by using one substrate.

Also, luminance may be improved by controlling the inclination angle of the oblique portion included in the roof layer and the width of the slit included in the pixel electrode.

Further, the viewing angle may be improved by forming the sub-pixel of the 4-domain structure.

In addition, other characteristics and advantages of the present inventive concept can be found through the exemplary embodiments of the present inventive concept.

BRIEF DESCRIPTION OF THE DRAWINGS

FIG. 4 is a cross-sectional view of one pixel of a liquid crystal display according to an exemplary embodiment of the present inventive concept of FIG. 3A taken along a line IV-IV.

FIG. 8 is a view showing a configuration of a liquid crystal when applying an electric field to a field generating electrode of a liquid crystal display according to an exemplary embodiment of the present inventive concept.

FIG. 9A and FIG. 9B are views showing a transmittance characteristic according to a slit interval of a liquid crystal display according to an exemplary embodiment of the present inventive concept.

FIG. 10A, FIG. 10B, FIG. 10C, and FIG. 10D are views showing a transmittance characteristic according to an oblique angle of an oblique portion of a liquid crystal display according to an exemplary embodiment of the present inventive concept.

DETAILED DESCRIPTION OF THE EMBODIMENTS

Figure 1:
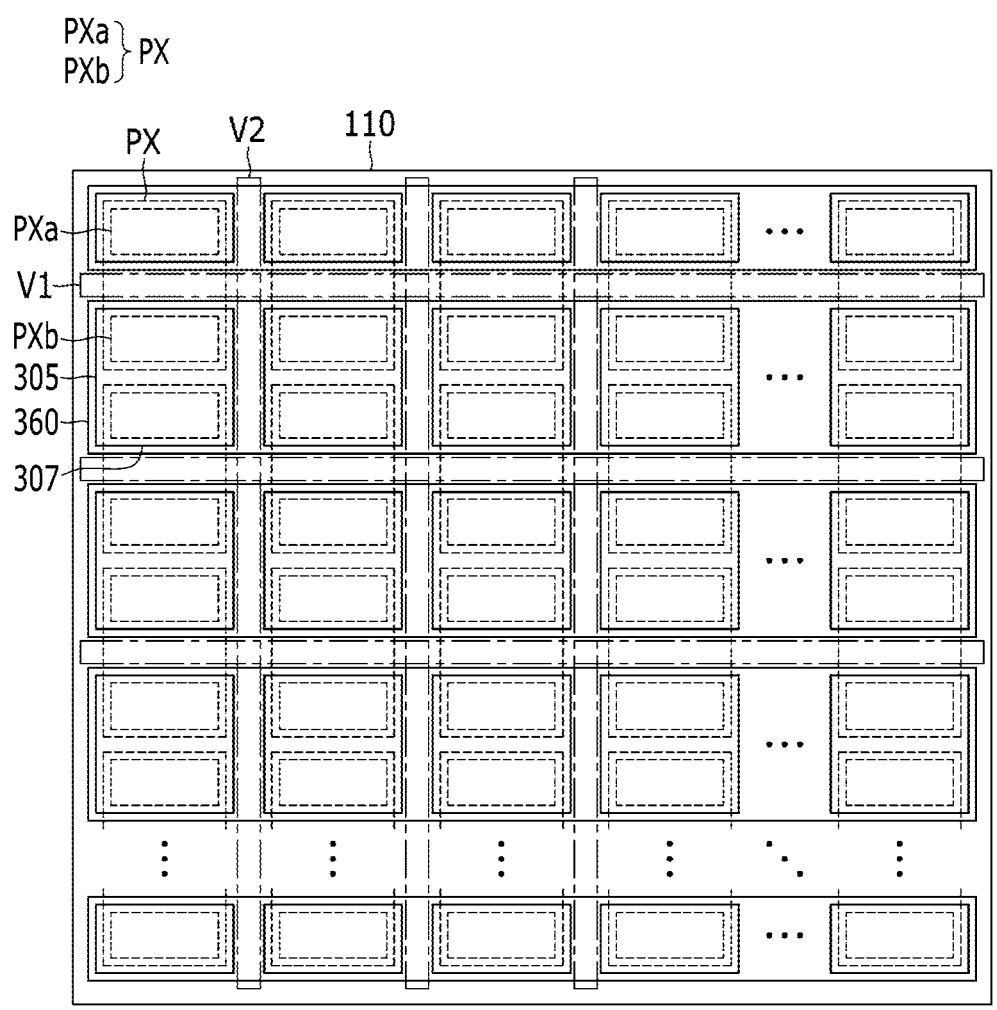
FIG. 1 is a top plan view of a liquid crystal display according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present between the element and the other element. In contrast, when an element is referred to as being "directly on" another element, there are no intervening elements present between the element and the other element.

Firstly, a liquid crystal display according to an exemplary embodiment of the present inventive concept will be described with reference to FIG. 1.

FIG. 1 is a top plan view of a liquid crystal display according to an exemplary embodiment of the present inventive concept.

A liquid crystal display according to an exemplary embodiment of the present inventive concept includes a substrate 110 made of a material such as glass or plastic.

The substrate 110 includes a plurality of pixel areas PXs. The plurality of pixel areas PXs are disposed in a matrix form which includes a plurality of pixel rows and a plurality of pixel columns. Each pixel area PX may include a first sub-pixel area PXa and a second sub-pixel area PXb. The first sub-pixel area PXa and the second sub-pixel area PXb may be vertically disposed.

Microcavities 305 covered by roof layers 360 are formed on the substrate 110. The roof layer 360 is connected in a row direction, and one roof layer 360 may form a plurality of microcavities 305.

A first valley V1 is positioned between the first and second subpixel areas PXa and PXb along a pixel row direction, and a second valley V2 is positioned between a plurality of pixel columns.

The plurality of roof layers 360 may be separated from each other with the first valley V1 interposed therebetween. The microcavities 305 may not be covered by the roof layer 360, but may be exposed to the outside at portions corresponding to the first valley V1. The exposed areas are referred to as injection holes 307.

Each roof layer 360 is separated from the substrate 110 between the adjacent second valleys V2 to form the microcavity 305. Further, each roof layer 360 is attached to the substrate 110 at the second valley V2 to cover both sides of the microcavity 305.

A structure of the display device according to the exemplary embodiment of the present inventive concept described above is just exemplified and may be variously modified. For example, a layout form of the pixel area PX, the first valley V1, and the second valley V2 may be changed, and the plurality of roof layers 360 may be connected to each other at the first valley V1, and a part of each roof layer 360 may be separated from the substrate 110 at the second valley V2 and thus the adjacent microcavities 305 may be connected to each other.

Next, one pixel of the display device according to the exemplary embodiment of the present inventive concept will be briefly described below with reference to FIGS. 2 and 3.

Figure 2:
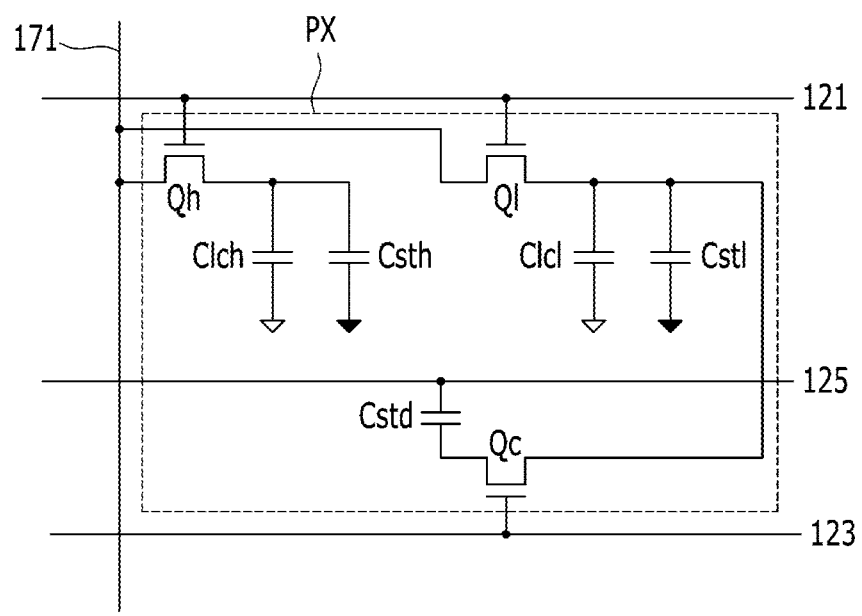
FIG. 2 is an equivalent circuit diagram of one pixel of a liquid crystal display according to an exemplary embodiment of the present inventive concept.
Figure 3A:
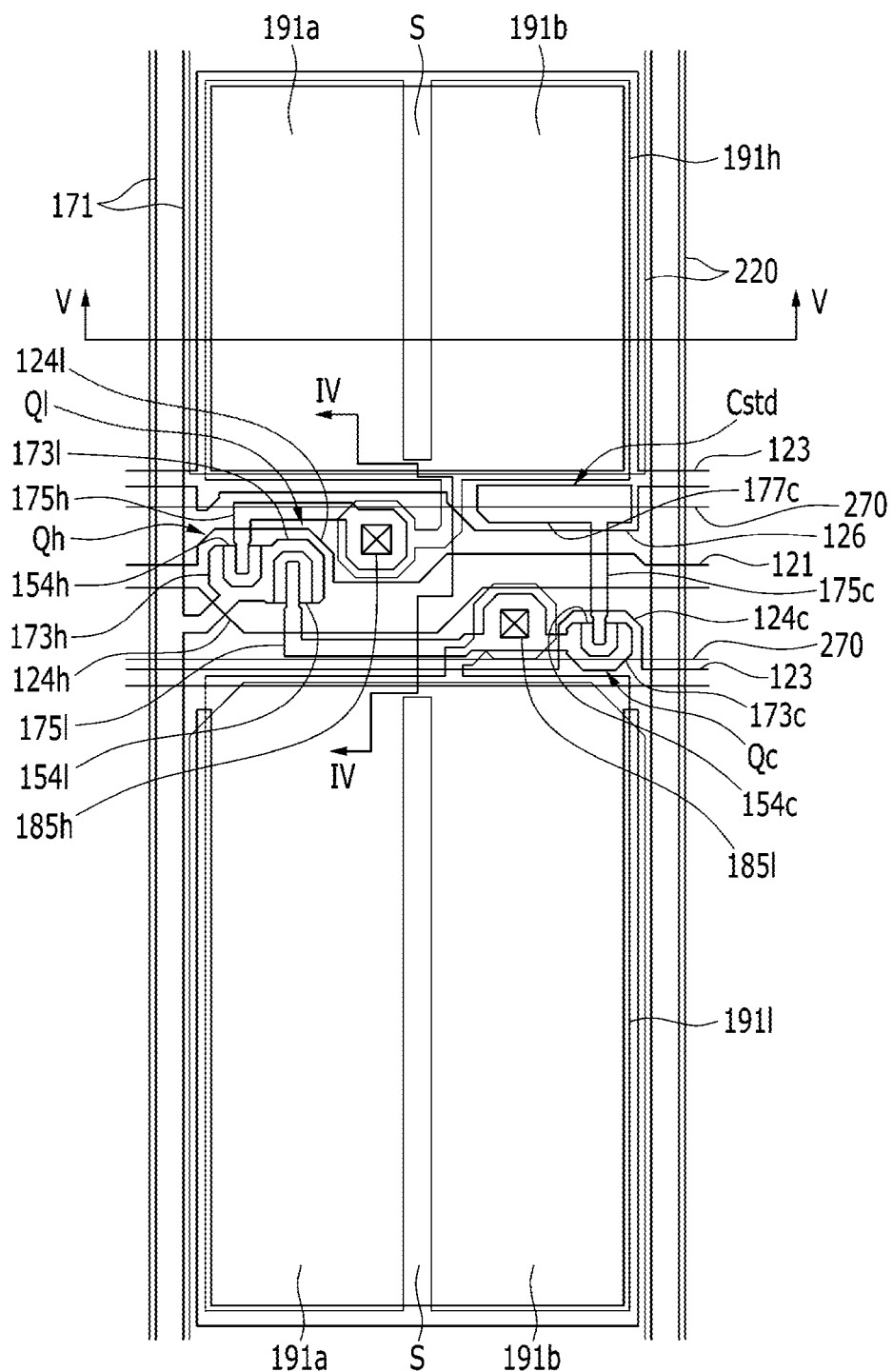
FIG. 3A and FIG. 3B are layout views of one pixel of a liquid crystal display according to an exemplary embodiment of the present inventive concept.
Figure 3B:
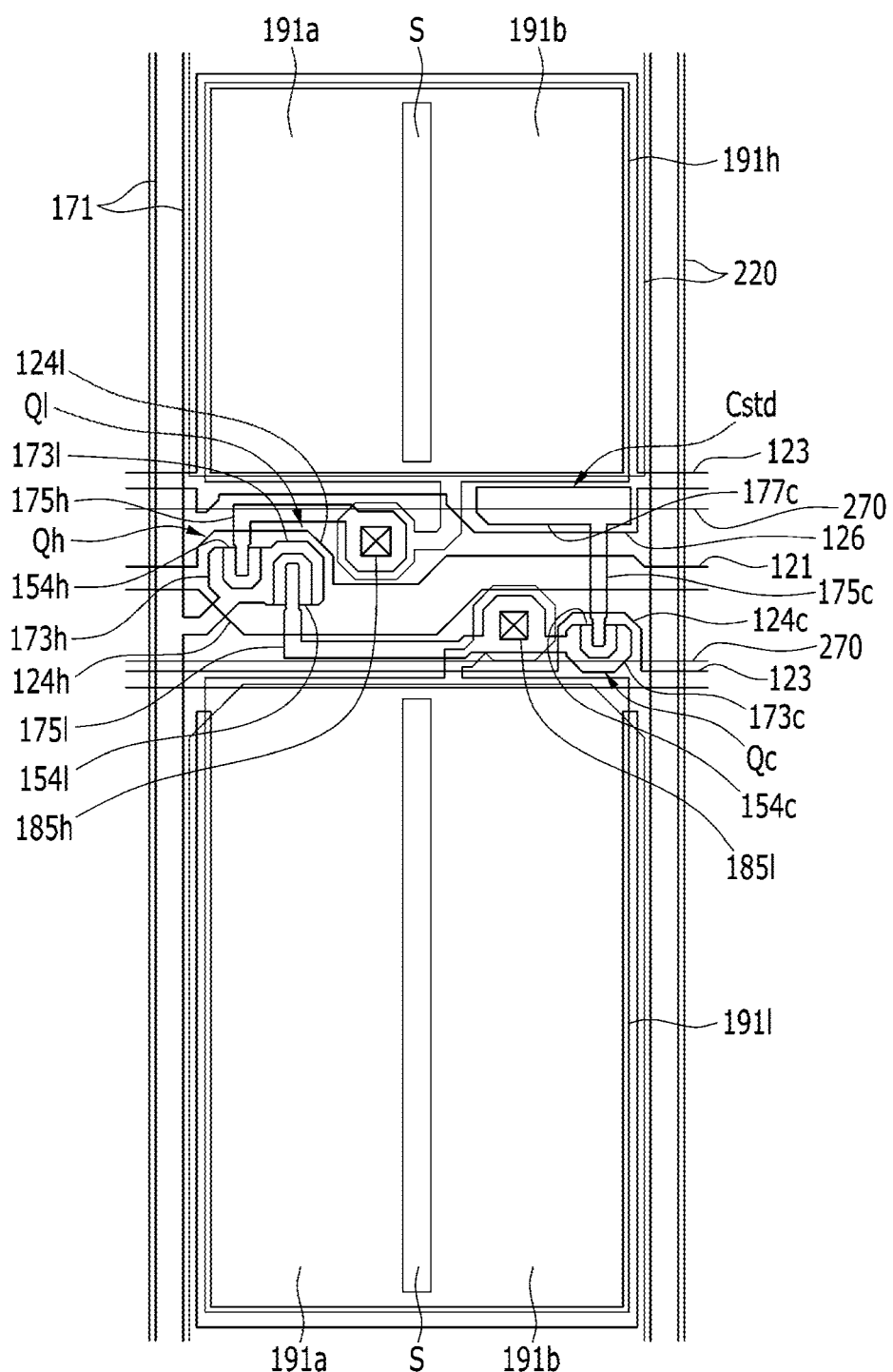

FIG. 2 is an equivalent circuit diagram of one pixel of the display device according to the exemplary embodiment of the present inventive concept, FIG. 3A and FIG. 3B are layout views illustrating one pixel of the display device according to the exemplary embodiment of the present inventive concept. FIG. 3A and FIG. 3B are the same except for a connected portion of the first electrode and the second electrode of the liquid crystal display according to an exemplary embodiment of the present inventive concept.

The display device according to the exemplary embodiment of the present inventive concept includes signal lines such as a gate line 121, a storage electrode line 125, a step-down gate line 123, and a data line 171.

A first switching element Qh, a second switching element Ql, a third switching element Qc, a first liquid crystal capacitor Clch, a second liquid crystal capacitor Clcl, a first storage capacitor Csth, a second storage capacitor Cstl, and a step-down capacitor Cstd are connected to the signal lines. Hereinafter, the first switching element Qh and the first thin film transistor Qh, the second switching element Ql and the second thin film transistor Ql, and the third switching element Qc and the third thin film transistor Qc are represented by the same reference numerals, respectively.

The first and second switching elements Qh and Ql are connected to the gate line 121 and the data line 171, respectively, and the third switching element Qc is connected to the step-down gate line 123.

The first and second switching elements Qh and Ql are three-terminal elements such as a thin film transistor formed on the substrate 110, and control terminals thereof are connected to the gate line 121, input terminals thereof are connected to the data line 171, and output terminals thereof are connected to the first and second liquid crystal capacitors Clch and Clcl and the first and second storage capacitors Csth and Cstl, respectively.

The third switching element Qc is also a three-terminal element such as a thin film transistor formed on the substrate 110, and a control terminal thereof is connected to the step-down gate line 123, an input terminal thereof is connected to the second liquid crystal capacitor Clcl, and an output terminal thereof is connected to the step-down capacitor Cstd.

The first and second liquid crystal capacitors Clch and Clcl are formed by overlapping first and second subpixel electrodes 191h and 191l connected with the first and second switching elements Qh and Q with a common electrode 270. The first and second subpixel electrodes 191h and 191l are formed below the microcavity 305, and the common electrode 270 is formed on the microcavity 305. The first and second storage capacitors Csth and Cstl are formed by overlapping the storage electrode line 125 with the first and second subpixel electrodes 191h and 191l.

The step-down capacitor Cstd is connected to the output terminal of the third switching element Qc and the storage electrode line 125, and is formed so that the storage electrode line 125 and the output terminal of the third switching element Qc are overlapped with an insulator therebetween.

Now, a driving method of the display device illustrated in FIGS. 2 and 3 will be described.

When a gate-on signal is applied to the gate line 121, the first switching element Qh and the second switching element Ql which are connected to the gate line 121 are turned on. As a result, the data voltage applied to the data line 171 is applied to the first subpixel electrode 191h and the second subpixel electrode 191l through the turned-on first switching element Qh and second switching element Ql. In this case, magnitudes of the data voltages applied to the first subpixel electrode 191h and the second subpixel electrode 191l are the same. Accordingly, the voltages charged in the first and second liquid crystal capacitors Clch and Clcl are also the same.

Thereafter, when a gate-off signal is applied to the gate line 121 and the gate-on signal is applied to the step-down gate line 123, the first switching element Qh and the second switching element Ql are turned off and the third switching element Qc is turned on. Then, charges move to the step-down capacitor Cstd from the second subpixel electrode 191l through the third switching element Qc. Subsequently, the charged voltage of the second liquid crystal capacitor Clcl is decreased, and the step-down capacitor Cstd is charged. Since the charged voltage of the second liquid crystal capacitor Clcl is decreased by capacitance of the step-down capacitor Cstd, the charged voltage of the second liquid crystal capacitor Clcl is lower than the charged voltage of the first liquid crystal capacitor Clch.

In this case, the charged voltages of the two liquid crystal capacitors Clch and Clcl represent different gamma curves, and a gamma curve of one pixel voltage becomes a curve acquired by combining the different gamma curves. A combined gamma curve at the front coincides with a reference gamma curve at the front which is most appropriately determined, and a combined gamma curve at the side becomes closest to the reference gamma curve at the front. As such, side visibility may be improved by converting image data.

Figure 5:
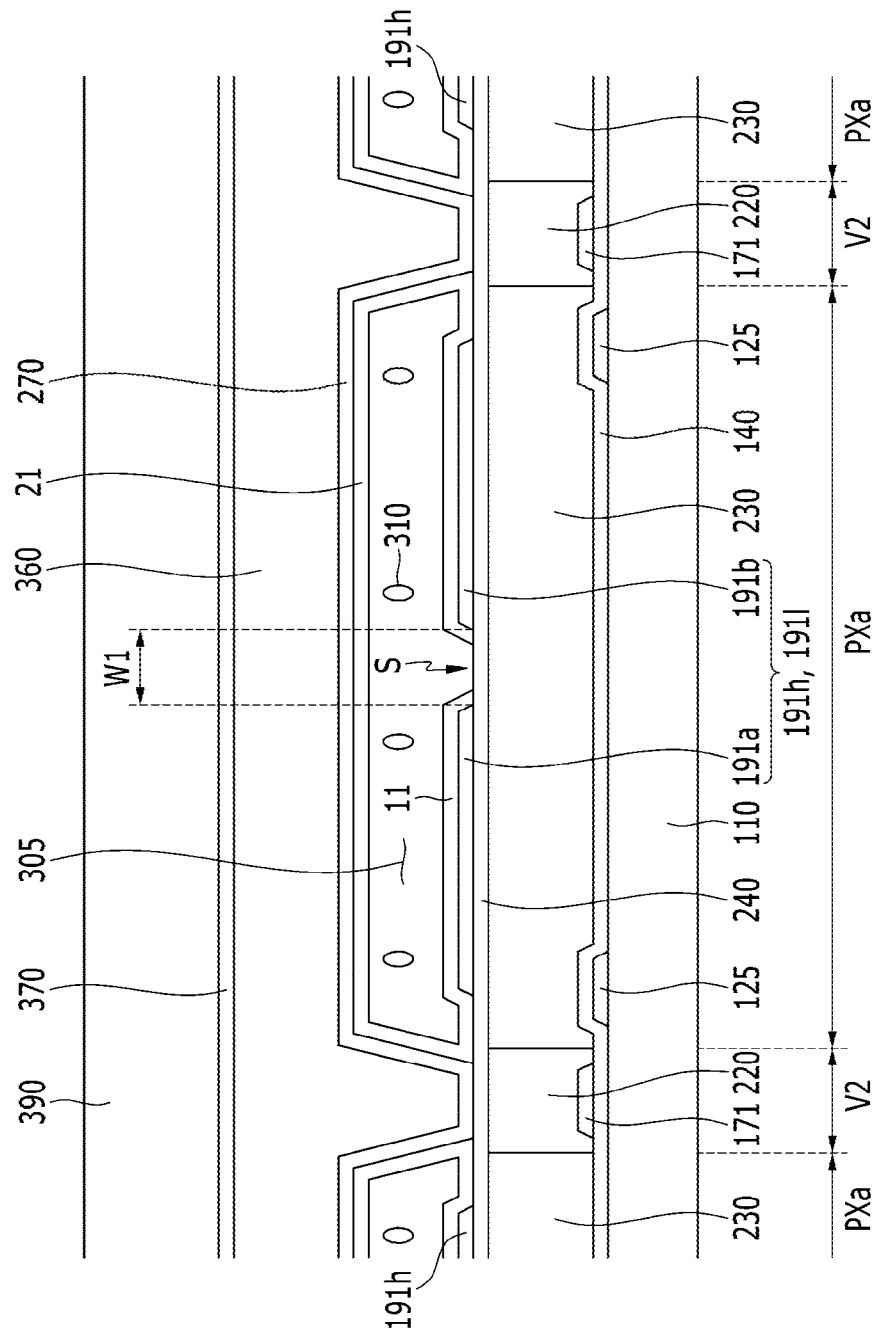
FIG. 5 is a cross-sectional view of one pixel of a liquid crystal display according to an exemplary embodiment of the present inventive concept of FIG. 3A taken along a line V-V.

FIG. 4 is a cross-sectional view of one pixel of a liquid crystal display according to an exemplary embodiment of the present inventive concept of FIG. 3A taken along a line IV-IV, and FIG. 5 is a cross-sectional view of one pixel of a liquid crystal display according to an exemplary embodiment of the present inventive concept of FIG. 3A taken along a line V-V.

As illustrated in FIG. 3A, FIG. 3B, FIG. 4, and FIG. 5, the display device according to the exemplary embodiment of the present inventive concept includes a gate conductor formed on the insulation substrate 110 and including the gate line 121, the step-down gate line 123, the storage electrode line 125, and the like.

The gate line 121 and the step-down gate line 123 mainly extend in a horizontal direction to transfer gate signals. The gate line 121 includes a first gate electrode 124h and a second gate electrode 124l protruding upward and downward, and the step-down gate line 123 includes a third gate electrode 124c protruding upward. The first gate electrode 124h and the second gate electrode 124l are connected with each other to form one protrusion. However, shapes of the protrusions which forms the first, second, and third gate electrodes 124h, 124l, and 124c may be changed.

The storage electrode line 125 also mainly extends in a horizontal direction to transfer a predetermined voltage such as common voltage Vcom. The storage electrode line 125 includes a capacitor electrode 126 which protrudes upward and downward to surround an edge of the pixel area, and, particularly, includes a capacitor electrode 126 which is expanded downward.

A gate insulating layer 140 is formed on the gate conductors 121, 123, and 125. The gate insulating layer 140 may be made of an inorganic insulating material such as a silicon nitride (SiNx) and a silicon oxide (SiOx). Further, the gate insulating layer 140 may be constituted by a single layer or a multi-layer.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124l, and the third semiconductor 154c may be positioned on the third gate electrode 124c. The first semiconductor 154h and the second semiconductor 154l may be connected to each other, and the second semiconductor 154l and the third semiconductor 154c may be connected to each other. Further, the first semiconductor 154h may extend below the data line 171. The first to third semiconductors 154h, 154l, and 154c may be made of amorphous silicon, polycrystalline silicon, a metal oxide semiconductor, and the like.

Ohmic contacts (not illustrated) may be further formed on the first to third semiconductors 154h, 154l, and 154c, respectively.

A data conductor including the data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal and mainly extends in a vertical direction to cross the gate line 121 and the step-down gate line 123.

The first source electrode 173h protruding from the data line 171 is formed on the first gate electrode 124h, and the second source electrode 173l is formed on the second gate electrode 124l. The first source electrode 173h and the second source electrode 173l are connected to each other to receive the same data signal from the data line 171.

The first drain electrode 175h, the second drain electrode 175l, and the third drain electrode 175c include one wide end portion and the other rod-shaped end portion, respectively. The rod-shaped end portions of the first drain electrode 175h and the second drain electrode 175l are partially surrounded by the first source electrode 173h and the second source electrode 173l, respectively. One wide end portion of the second drain electrode 175l again extends to form a third source electrode 173c which is bent in a 'U'-shape. A wide end portion 177c of the third drain electrode 175c is overlapped with the capacitor electrode 126 to form the step-down capacitor Cstd, and the rod-shaped end portion is partially surrounded by the third source electrode 173c.

The first/second/third gate electrodes 124h/124l/124c, the first/second/third source electrodes 173h/173l/173c, and the first/second/third drain electrodes 175h/175l/175c form first/second/third thin film transistors (TFTs) Qh/Ql/Qc together with the first/second/third semiconductors 154h/154l/154c, respectively, and channels of the thin film transistors are formed in the respective semiconductors 154h/154l/154c between the respective source electrodes 173h/173l/173c and the respective drain electrodes 175h/175l/175c.

A passivation layer 180 is formed on the data conductors 171, 173h, 173l, 173c, 175h, 175l, and 175c and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed as a single layer or a multi-layer.

A color filter 230 in each pixel area PX is formed on the passivation layer 180. Each color filter 230 may display one of primary colors such as three primary colors of red, green, and blue. The color filter 230 is not limited to the three primary colors of red, green, and blue, but may display cyan, magenta, yellow, and white-based colors. Unlike as illustrated above, the color filter 230 may be elongated in a column direction along a space between the adjacent data lines 171.

A light blocking member 220 is formed in a region between adjacent color filters 230. The light blocking member 220 is formed on a boundary of the pixel area PX and the thin film transistor to prevent light leakage. That is, the light blocking member 220 may be formed at the first valley V1 and the second valley V2. The color filter 230 and the light blocking member 220 may partially overlap with each other.

A first insulating layer 240 may be further formed on the color filter 230 and the light blocking member 220. The first insulating layer 240 may be made of an inorganic insulating material such as a silicon nitride (SiNx) and a silicon oxide (SiOx). The first insulating layer 240 serves to protect the color filter 230 and the light blocking member 220 which are made of the organic materials, and may be omitted if necessary.

A plurality of first contact holes 185h and a plurality of second contact holes 185l which expose the wide end portion of the first drain electrode 175h and the wide end portion of the second drain electrode 175l, respectively, are formed in the first insulating layer 240, the light blocking member 220, and the passivation layer 180.

A pixel electrode 191 is formed on the first insulating layer 240. The pixel electrode 191 includes a slit S formed at a center of the pixel electrode 191. In this case, a width of the slit S may be formed of a range of 1 to 11 μm.

That is, the pixel electrode 191 includes the first sub-pixel electrode 191h and the second sub-pixel electrode 191l, and the first and second sub-pixel electrodes 191h/191l include a first electrode 191a and a second electrode 191b that are respectively at a right side and a left side with respect to the slit S. The first electrode 191a and the second electrode 191b may be respectively formed of a plate shape at the left side and the right side with the respect to the slit S. In this case, as shown in FIG. 3A, the first electrode 191a and the second electrode 191b may be formed to be connected at one side outside the slit S, and in another exemplary embodiment, as shown in FIG. 3B, the first electrode 191a and the second electrode 191b may be formed to be connected at both sides outside the slit S.

In the liquid crystal display according to an exemplary embodiment of the present inventive concept, by forming the slit S at the center of the pixel electrode 191, the transmittance deterioration due to a breakage phenomenon of the liquid crystal alignment layer may be prevented in the center portion of the pixel area. This will be described in detail later. The pixel electrode 191 may be formed of the transparent metal material such as indium-tin oxide (ITO), indium-zinc oxide (IZO).

The pixel electrode 191 includes the first sub-pixel electrode 191h and the second sub-pixel electrode 191l that are separated from each other on the gate line 121 and the step-down gate line 123. The first sub-pixel electrode 191h and the second sub-pixel electrode 191l are disposed on and below the gate line 121 and the step-down gate line 123, and neighbor each other in a column direction. That is, the first subpixel electrode 191h and the second subpixel electrode 191l are separated from each other with the first valley V1 therebetween, the first subpixel electrode 191h is positioned in the first subpixel area PXa, and the second subpixel electrode 191*l* is positioned in the second subpixel area PXb.

The first sub-pixel electrode 191*h* and the second subpixel electrode 191*l* are connected to the first drain electrode 175*h* and the second drain electrode 175*l* through the first contact hole 185*h* and the second contact hole 185*l*, respectively. Accordingly, when the first thin film transistor Qh and the second thin film transistor Ql are the ON state, the data voltage is applied from the first drain electrode 175*h* and the second drain electrode 175*l*.

The common electrode 270 is formed on the pixel electrode 191 to be separate from the pixel electrode 191 by a predetermined distance. The microcavities 305 are formed between the pixel electrode 191 and the common electrode 270. The width and the area of the microcavities 305 may be variously changed according to the resolution of the display device.

The common electrode 270 may be made of the transparent metal material such as ITO and IZO. A constant voltage may be applied to the common electrode 270, and an electric field may be formed between the pixel electrode 191 and the common electrode 270.

Here, the common electrode 270 may be formed of plate shape electrodes parallel to the gate line 121 to cover an upper side, a right side and a left side of the microcavities 305, and a connection portion connecting the adjacent plate shape common electrodes with each other.

A liquid crystal layer including liquid crystal molecules 310 is formed in the microcavity 305 positioned between the pixel electrode 191 and the common electrode 270. The liquid crystal molecules 310 have negative dielectric anisotropy, and may arranged in a vertical direction with respect to the substrate 110 while the electric field is not applied. That is, the liquid crystal molecules 310 are vertical alignment type liquid crystal molecules.

A first alignment layer 11 is formed on the pixel electrode 191. The first alignment layer 11 may be formed even on the first insulating layer 240 that is not covered by the pixel electrode 191.

A second alignment layer 21 is formed below the common electrode 270 to face the first alignment layer 11.

The first alignment layer 11 and the second alignment layer 21 may include a vertical alignment layer, and may be made of a material such as polyamic acid, polysiloxane, polyimide, and the like. The first and the second alignment layers 11 and 21 may be may be formed through a same process step and be connected to each other at the edge of the pixel area PX.

The first sub-pixel electrode 191*h* and the second sub-pixel electrode 191*l* to which the data voltage is applied generate the electric field together with the common electrode 270 to thereby determine an orientation of liquid crystal molecule 310 positioned within the micro-cavity 305 formed between the pixel electrode 191 and the common electrode 270. Luminance of light passing through the liquid crystal layer varies based on the orientation of liquid crystal molecules 310 which is determined by the data voltage applied to the first sub-pixel electrode 191*h* and the second sub-pixel electrode 191*l*.

The first subpixel electrode 191*h* and the common electrode 270 form a first liquid crystal capacitor Clch together with the liquid crystal layer therebetween, and the second subpixel electrode 191*l* and the common electrode 270 form a second liquid crystal capacitor Clcl together with the liquid crystal layer therebetween. As a result, even after the first and second thin film transistors Qh and Ql are turned off, the applied voltage is maintained by the first liquid crystal capacitor Clch and the second liquid crystal capacitor Clcl.

The first and second subpixel electrodes 191*h* and 191*l* overlap with the storage electrode line 125 to form the first and second storage capacitors Csth and Cstl, and the first and second storage capacitors Csth and Cstl maintain the voltage between the first and second subpixel electrodes 191*h* and 191*l*, and the common electrode 270.

The capacitor electrode 126 and a wide end portion 177*c* of the third drain electrode 175*c* overlap with each other with the gate insulating layer 140 therebetween to form the step-down capacitor Cstd.

As describe above, the first subpixel electrode 191*h* and the second subpixel electrode 191*l* to which the data voltages are applied generate the electric field together with the common electrode 270, and as a result, the liquid crystal molecules 310 of the liquid crystal layer which are aligned so as to be vertical with respect to the surfaces of the two electrodes 191 and 270 while the electric field is not applied are tilted in a direction parallel to the surfaces of the two electrodes 191 and 270 and luminance of light passing through the liquid crystal layer varies according to the tilted degree of the liquid crystal molecules 310.

The microcavities 305 are enclosed by the pixel electrode 191 and the common electrode 270.

The common electrode 270 is formed to be connected directly on the first insulating layer 240 at the second valley V2 and thus the common electrode 270 may be formed to cover a left side and a right side of the microcavity 305. That is, the common electrodes 270 are connected to each other along the plurality of pixel rows, and a height of the common electrode 270 positioned at the second valley V2 is smaller than a height of the common electrode positioned in the pixel area PX. The reason is that the microcavities 305 are not formed below the common electrode 270 positioned at the second valley V2.

The common electrode 270 is not formed on at least a partial region of the first valley V1. That is, the common electrode 270 is formed so as not to cover at least a part of the upper side and the lower side of the pixel area PX and thus a part of the microcavity 305 is exposed outside. The side where the microcavity 305 is exposed is called a liquid crystal injection hole 307. The liquid crystal injection holes 307 are formed at one edge of the microcavities 305 of the direction parallel to the data line 171 according to the first valley V1, and the liquid crystal material is injected inside the microcavities 305 through the liquid crystal injection hole 307.

In the above, the common electrode 270 covers the left surface and the right surface of the microcavities 305 and does not cover at least a portion of the upper surface and the lower surface of the microcavities 305, but the present inventive concept is not limited thereto, and the common electrode 270 may be formed to cover other surfaces of the microcavities 305. For example, the common electrode 270 may cover the upper surface and the lower surface of the microcavities 305 and at least a portion of the left surface and the right surface thereof may not be covered. In this case, the liquid crystal injection hole 307 may be formed along the second valley V2.

The roof layer 360 is formed on the common electrode 270. The roof layer 360 may be made of an organic material. The microcavity 305 is formed below the roof layer 360, and a shape of the microcavity 305 may be maintained by the roof layer 360.

The roof layers 360 are connected to each other along the plurality of pixel rows like the common electrode 270, and the liquid crystal injection hole 307 is formed along the first valley V1 in the roof layer 360 and thus a part of the microcavity 305 is exposed outside.

Figure 7:
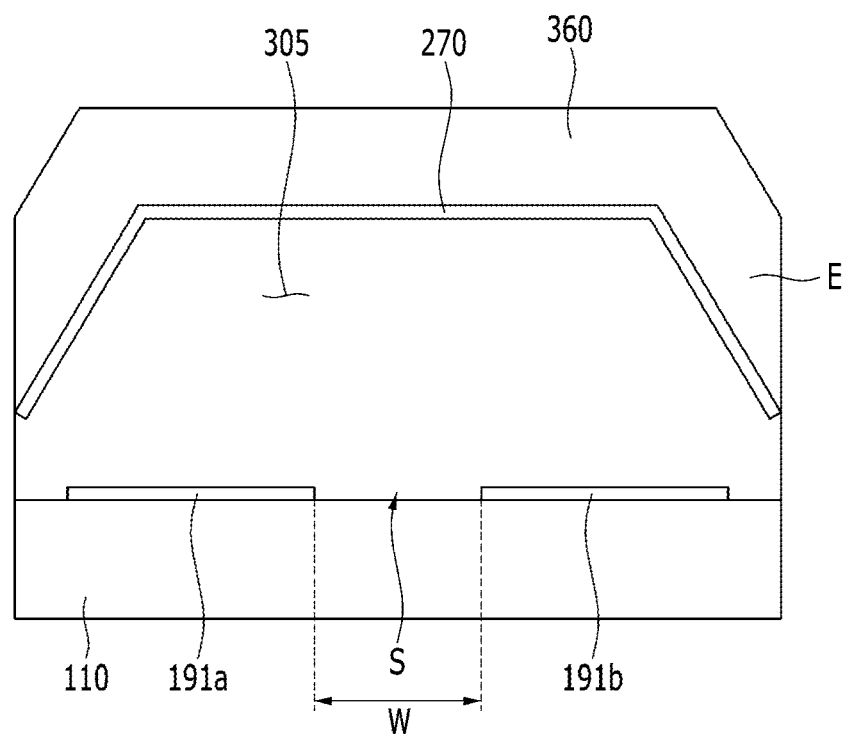
FIG. 7 is a cross-sectional view of a basic region of a field generating electrode of a liquid crystal display according to an exemplary embodiment of the present inventive concept of FIG. 6 taken along a line VII-VII.

The roof layer 360 includes an oblique portion E as disclosed in FIGS. 7 and 8 that is formed to be inclined at both sides of the microcavities 305.

The oblique portion E is formed to cover both outer sides of the microcavities 305 and may have an oblique angle of about 10 degrees to about 80 degrees.

A second insulating layer 370 may be formed on the roof layer 360. The second insulating layer 370 may be made of an inorganic insulating material such as a silicon nitride (SiNx) and a silicon oxide (SiOx). The second insulating layer 370 may be formed to cover the upper side and the both sides of the roof layer 360. The second insulating layer 370 serves to protect the roof layer 360 made of an organic material, and may be omitted if necessary.

An overcoat 390 may be formed on the second insulating layer 370. The overcoat 390 is formed to cover the liquid crystal injection hole 307 where a part of the microcavity 305 is exposed to outside.

That is, the overcoat 390 may seal the microcavity 305 so that the liquid crystal molecules 310 formed in the microcavity 305 are not discharged to outside of the microcavity 305. Since the overcoat 390 contacts the liquid crystal molecules 310, the overcoat 390 may be made of a material which does not react with the liquid crystal molecules 310. For example, the overcoat 390 may be made of parylene and the like.

The overcoat 390 may be formed of a multilayer such as a double layer and a triple layer. The double layer is configured by two layers made of different materials. The triple layer is configured by three layers, and materials of adjacent layers are different from each other. For example, the overcoat 390 may include a layer made of an organic insulating material and a layer made of an inorganic insulating material.

Although not illustrated, polarizers may be further formed on the upper and lower sides of the display device. The polarizers may be configured by a first polarizer and a second polarizer. The first polarizer is attached onto the lower side of the substrate 110, and the second polarizer may be attached onto the overcoat 390.

Hereinafter, a basic form of the field generating electrode of the display device according to the exemplary embodiment of the present inventive concept will be described with reference to FIG. 6 to FIG. 8.

Figure 6:
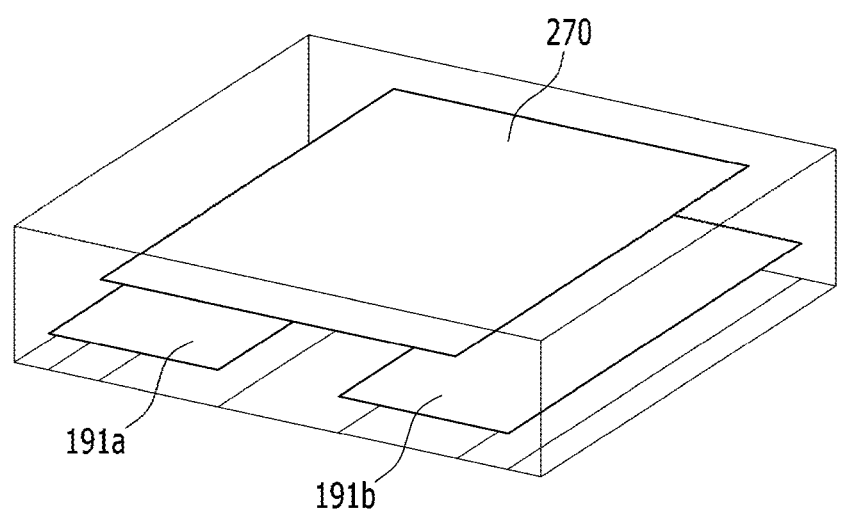
FIG. 6 is a perspective view of a basic form of a field generating electrode of a liquid crystal display according to an exemplary embodiment of the present inventive concept.

FIG. 6 is a perspective view of a basic form of a field generating electrode of a liquid crystal display according to an exemplary embodiment of the present inventive concept, FIG. 7 is a cross-sectional view of a field generating electrode of a liquid crystal display according to an exemplary embodiment of the present inventive concept, and FIG. 8 is a view showing a configuration of a liquid crystal when applying an electric field to a field generating electrode of a liquid crystal display according to an exemplary embodiment of the present inventive concept.

Firstly, referring to FIG. 6 and FIG. 7, the field generating electrode includes the common electrode 270 of the plate shape disposed on the microcavities 305 and the pixel electrode 191 disposed under the microcavities 305 and including the slit S in the center.

The pixel electrode 191 includes the first electrode 191a and the second electrode 191b positioned at the right side and the left side with respect to the slit S. The first electrode 191a and the second electrode 191b extend in the direction parallel to the data line (not shown) and are respectively formed of one plate shape at the right side and the left side with respect to the slit S. In this case, the width W of the slit S may be formed with the range of 1 to 11 µm.

The roof layer 360 is positioned on the common electrode 270. The roof layer 360 may be formed to cover the microcavities 305, and includes the oblique portion E formed to be inclined at both sides of the microcavities 305. In this case, the oblique angle of the oblique portion E may be formed of the range of 10 degrees to 80 degrees with respect to the roof layer 360.

The liquid crystal molecules initially aligned to be vertical with respect to walls of the microcavities 305 are inclined toward the direction parallel to the surface of two electrodes 191 and 270 by the electric field formed by the pixel electrode 191 and the common electrode 270.

In this case, when the vertically arranged liquid crystal molecules are rearranged through the electric field, the liquid crystal molecules should be aligned with continuity. However, when using the non-patterned common electrode 270 and the pixel electrode 191, the continuity of the liquid crystal molecules at the center of the pixel area is destroyed such that the transmittance of the pixel at the center is reduced.

In the liquid crystal display according to an exemplary embodiment of the present inventive concept, by forming the pixel electrode 191 including the slit S at the center of the pixel area, the transmittance deterioration due to the discontinuity of the liquid crystal at the center of the pixel area is thereby prevented.

Referring to FIG. 8, in the liquid crystal display according to an exemplary embodiment of the present inventive concept, when applying the electric field to the liquid crystal molecules 305 using the common electrode 270 having the oblique portion E, the oblique portion E may give directionality to the liquid crystal molecules 310, and the rearrangement of the liquid crystal molecules starts at the edges of the microcavity 305 and progresses to the center of the pixel area in which slit S of the pixel electrode 191 exists, such that the liquid crystal molecules may be arranged with continuity even at the center part of the pixel area.

Figure 9A:
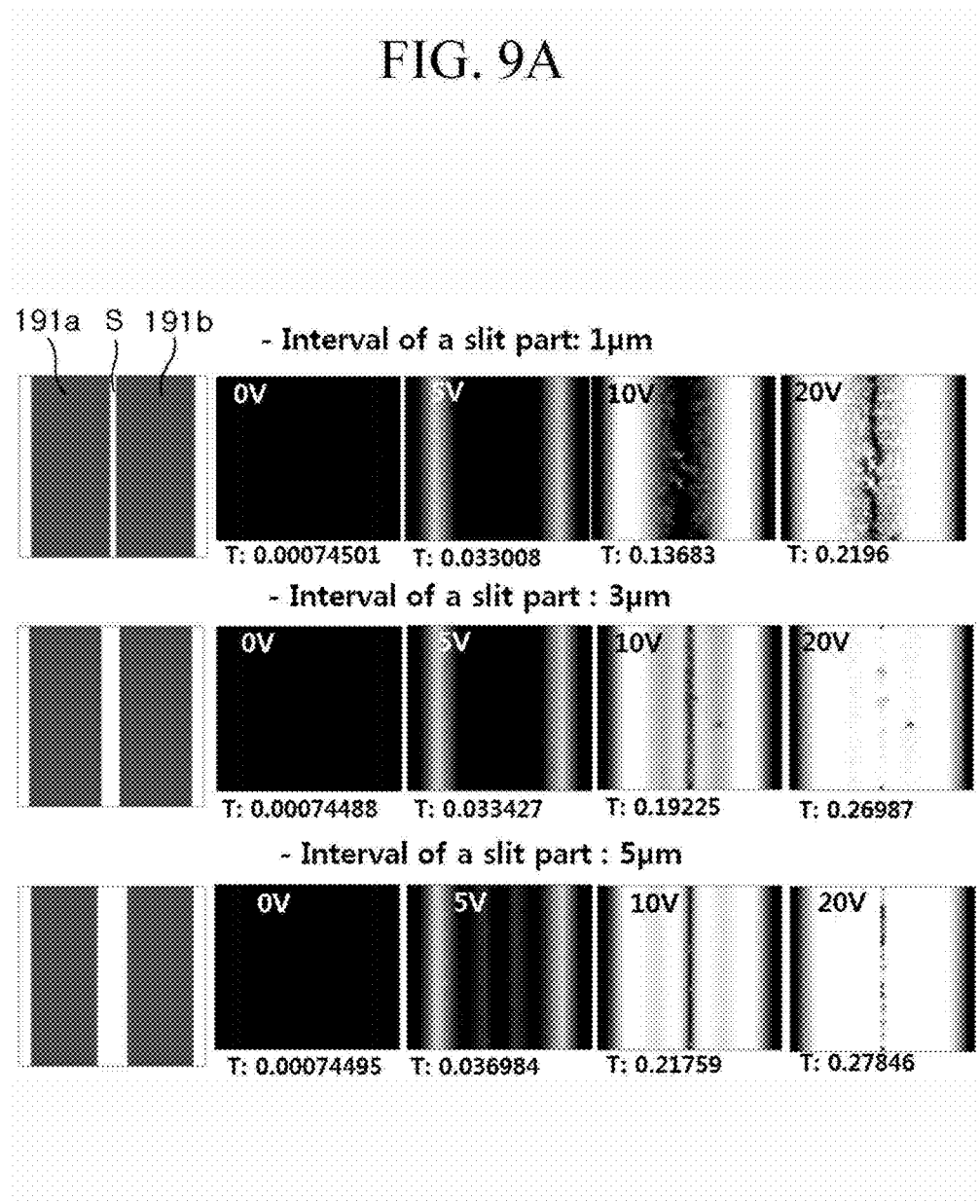
Figure 10A:
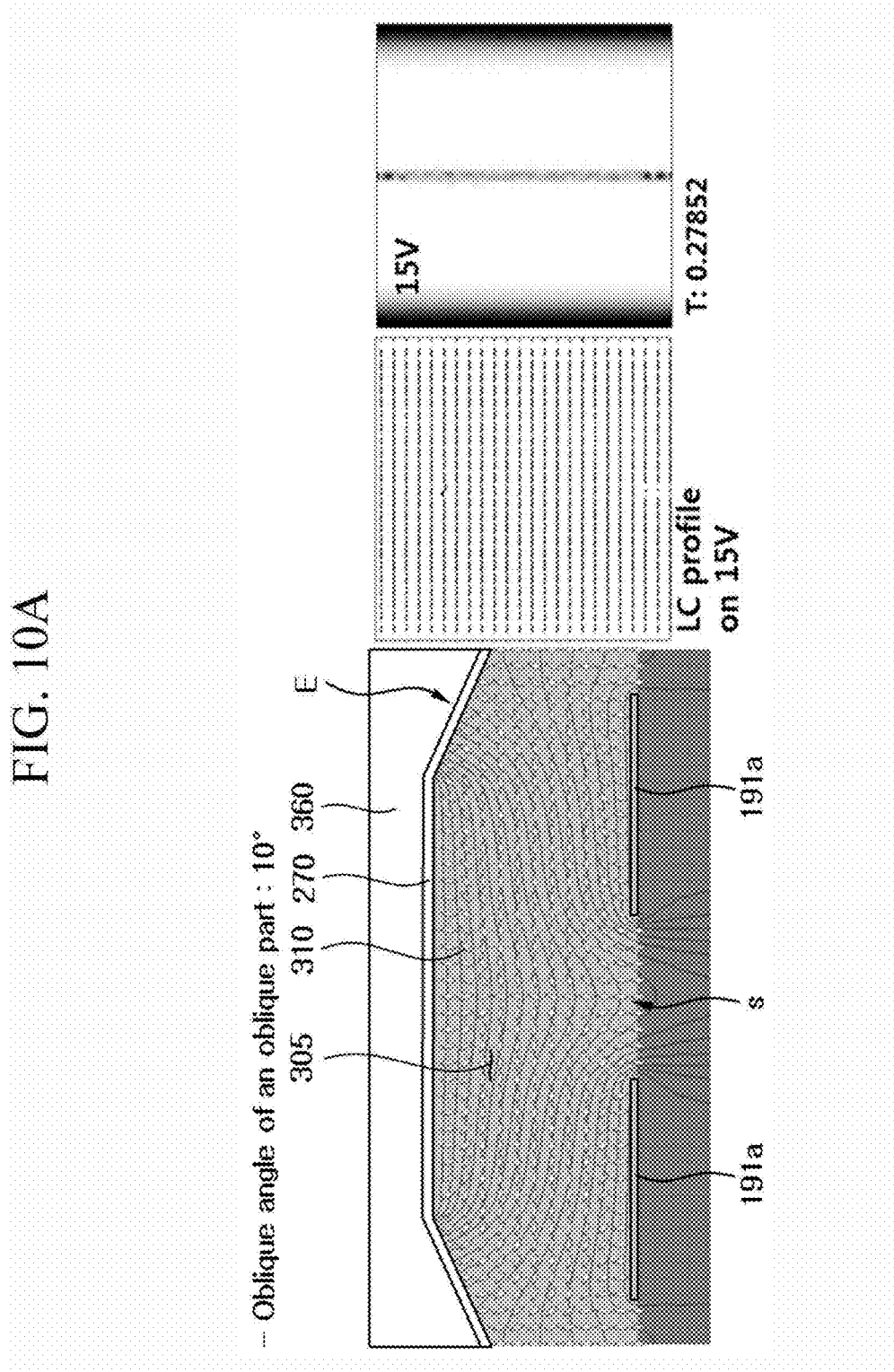
Figure 10C:
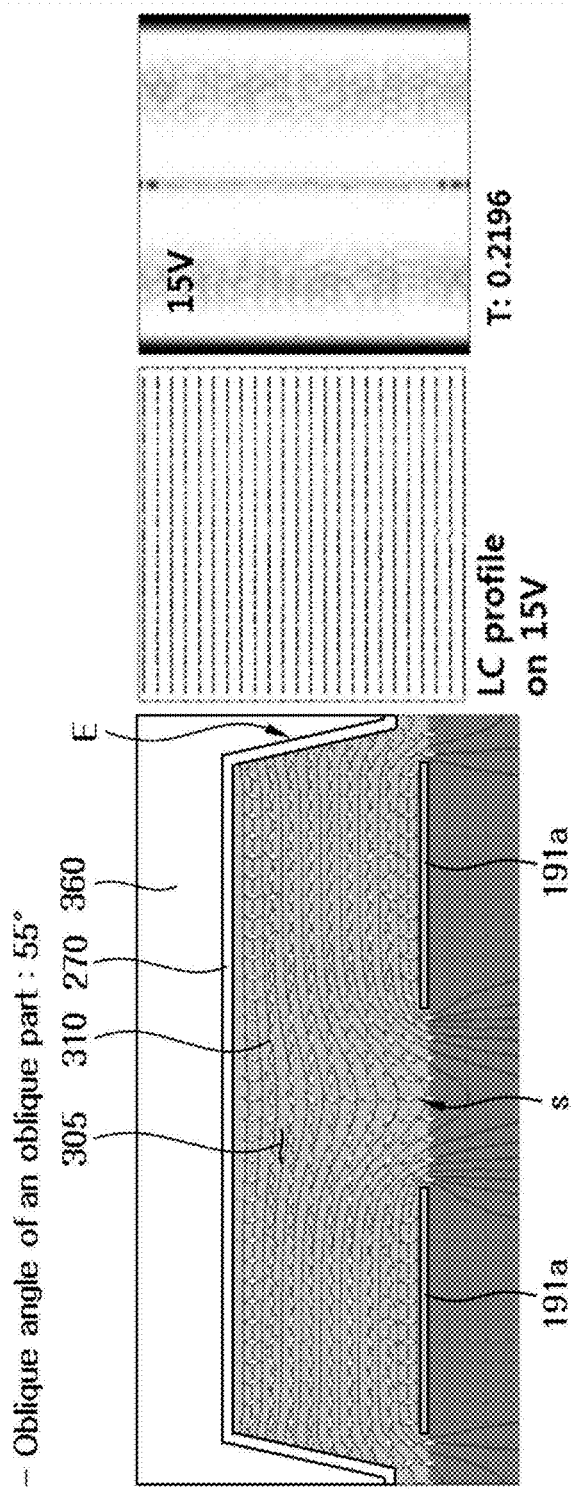
Figure 10D:
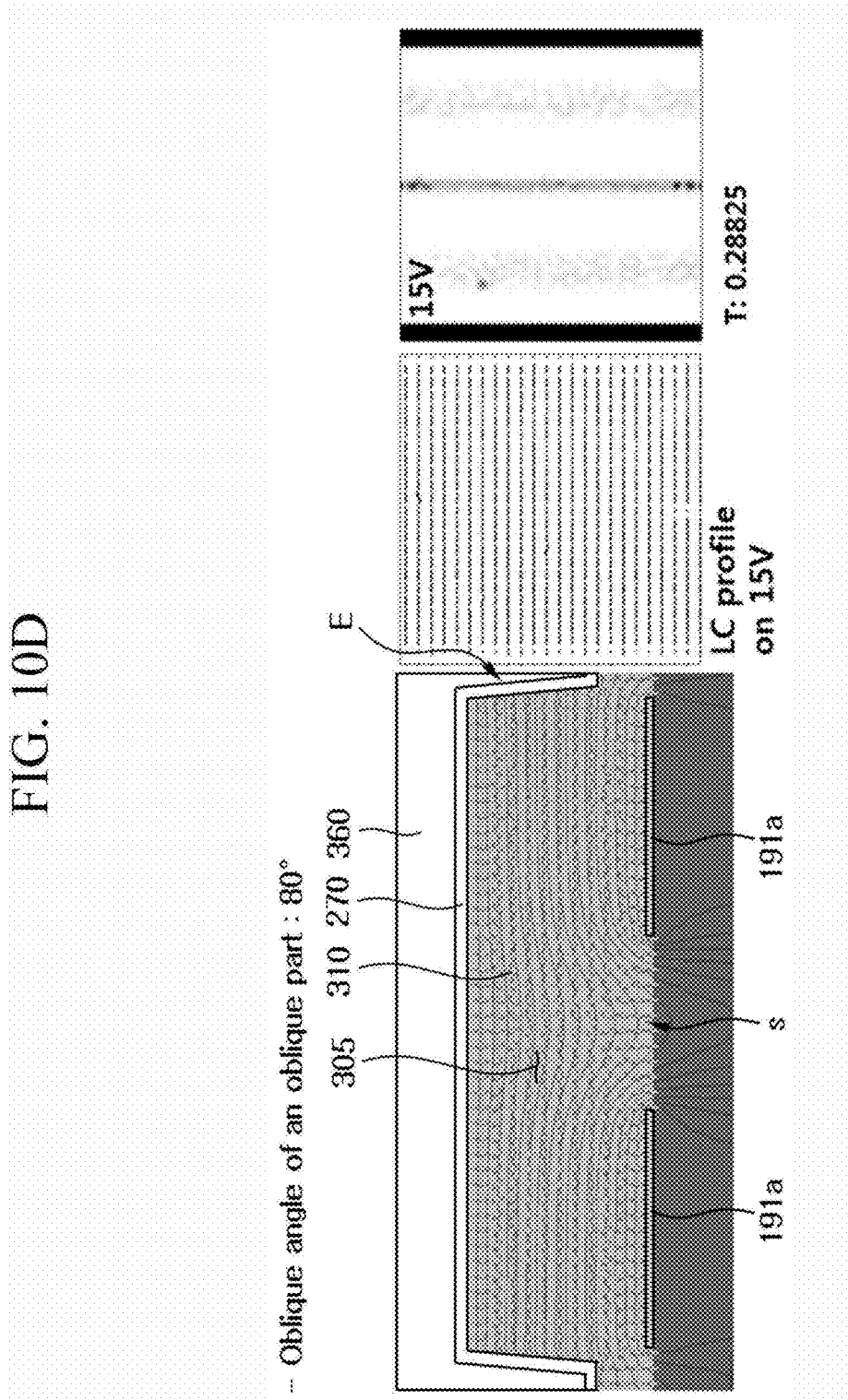

FIG. 9A and FIG. 9B are views showing a transmittance characteristic according to a width of the slit of a liquid crystal display according to an exemplary embodiment of the present inventive concept when the inclination angle of the oblique portion E included in the roof layer is fixed at 50 degrees while the width of the slit included in the pixel electrode is changed.

Referring to FIG. 9A and FIG. 9B, the liquid crystal display according to an exemplary embodiment of the present inventive concept includes the slit S positioned at the center of the pixel area, and the first electrode 191a and the second electrode 191b positioned at the right side and the left side of the slit S.

In this case, the width of the slit S may be formed in the range of about 1 to about 11 µm. When the width of the slit S is in the rage of about 5 µm to about 9 µm the transmittance of the pixel is improved greatly. When the width of the slit S is 7 µm, the transmittance is best.

FIG. 10A to FIG. 10D are views showing a transmittance characteristic according to an oblique angle of an oblique portion of a liquid crystal display according to an exemplary embodiment of the present inventive concept, and are simulation views for measuring the transmittance in a condition that the width of the slit included in the pixel electrode is fixed at 7 µm while changing the angle that the oblique portion included in the roof layer is inclined.

Referring to FIG. 10A to FIG. 10D, in the liquid crystal display according to an exemplary embodiment of the present inventive concept, the roof layer 360 is formed on the microcavities 305 in which the liquid crystal molecules 310 are positioned, and the roof layer 360 includes the oblique portion E that is inclined at the both outer edges of the microcavities 305.

The inclination angle of the oblique portion E may be variously formed from about 10 degrees to about 80 degrees, and the oblique portion E of the roof layer 360 may be included with the predetermined angle such that the rearrangement of the liquid crystal molecules starts at the edges of the microcavity 305 and progresses to the center of the pixel area in which slit S of the pixel electrode 191 exists.

That is, the liquid crystal display according to an exemplary embodiment of the present inventive concept controls the inclination angle of the oblique portion E included in the roof layer 360 and the width W of the slit S included in the pixel electrode 191, thereby improving the luminance.

Next, the sub-pixel of the liquid crystal display according to an exemplary embodiment of the present inventive concept with the improved viewing angle will be described with reference to FIG. 11 and FIG. 12.

Figure 11:
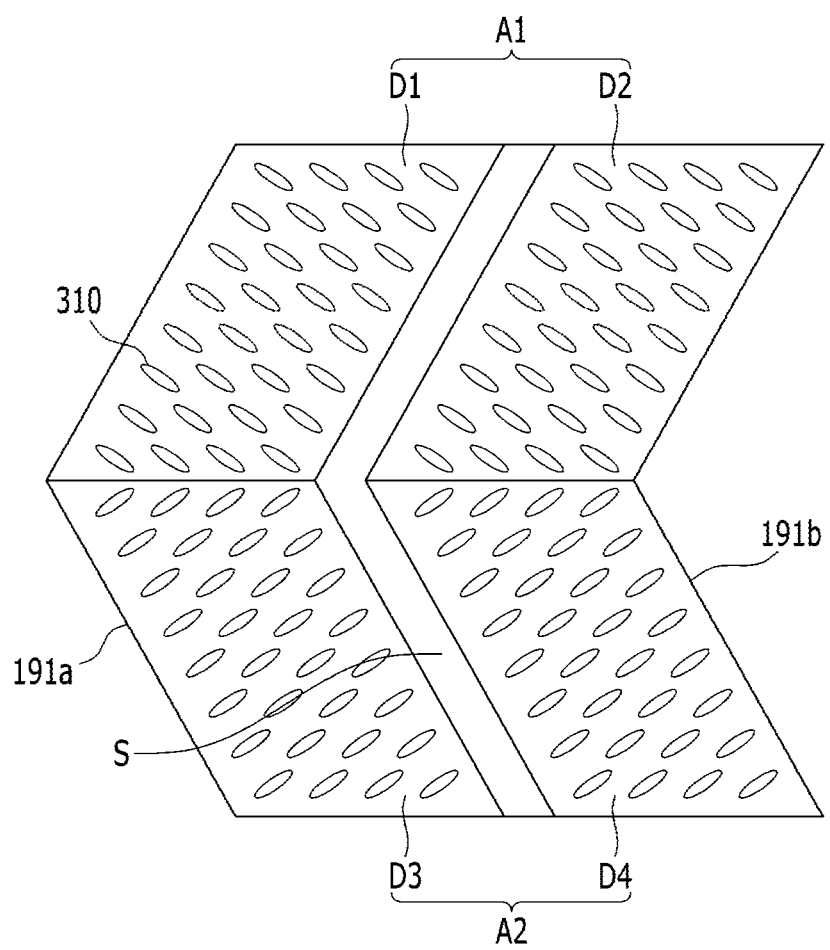
FIG. 11 is a plane view of a sub-pixel of a liquid crystal display according to an exemplary embodiment of the present inventive concept.
Figure 12:
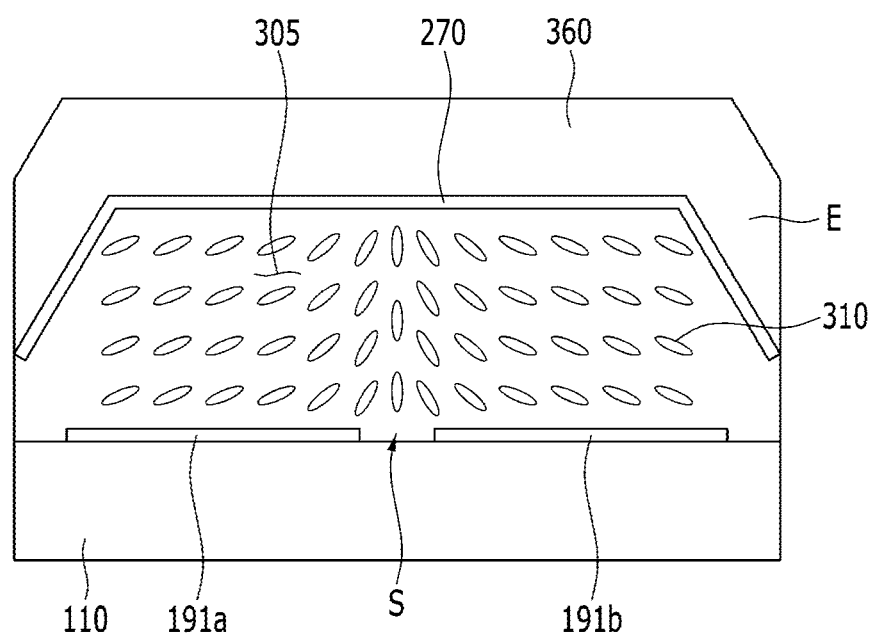
FIG. 12 is a cross-sectional view of a sub-pixel of the liquid crystal display of FIG. 11 taken along a line XII-XII.

FIG. 11 is a plan view of a sub-pixel of a liquid crystal display according to an exemplary embodiment of the present inventive concept, and FIG. 12 is a cross-sectional view of a sub-pixel of the liquid crystal display of FIG. 11 taken along a line XII-XII.

Referring to FIG. 11 and FIG. 12, one sub-pixel of the liquid crystal display according to an exemplary embodiment of the present inventive concept may be formed with a 4-domain structure.

One sub-pixel of the liquid crystal display according to the present inventive concept includes the common electrode 270 having the plate shape and disposed on the microcavities 305, and the pixel electrode 191 including the slit S and disposed under the microcavities 305.

The pixel electrode 191 includes the first electrode 191a and the second electrode 191b positioned on a right side and a left side of the slit S.

The first and second electrodes 191a and 191b are divided into first and second domain regions inclined by +45 degrees with respect to the center line, and third and fourth domain regions inclined by −45 degrees with respect to the center line.

That is, the first electrode 191a includes the first domain region D1 inclined by +45 degrees with respect to the center line thereby being slanted from the lower left toward the upper right and the third domain region D3 inclined by −45 degrees with respect to the center line thereby being slanted from the upper left toward the lower right, and the second electrode 191b includes the second domain region D2 inclined by +45 degrees with respect to the center line thereby being slanted from the lower left toward the upper right and the fourth domain region D4 inclined by −45 degrees with respect to the center line thereby being slanted from the upper left toward the lower right.

In the pixel structure including the above-described 2-domain region, when applying the electric field, the liquid crystal molecules 310 are inclined with right and left symmetry with respect to the slit S such that the viewing angle is compensated in the right and left directions, that is, the lateral directions, however the viewing angle of the vertical direction is not compensated. However, one sub-pixel of the liquid crystal display according to an exemplary embodiment of the present inventive concept includes the 4 domain regions such that the direction of the liquid crystal molecules 310 is not only divided right and left, but is also divided up and down with respect to the slit S, thereby improving the viewing angle in the vertical direction as well as the lateral direction.

Next, a manufacturing method of the liquid crystal display according to an exemplary embodiment of the present inventive concept will be described with reference to FIG. 13 to FIG. 32. Furthermore, FIG. 1 to FIG. 5 will be described together therewith.

Figure 13:
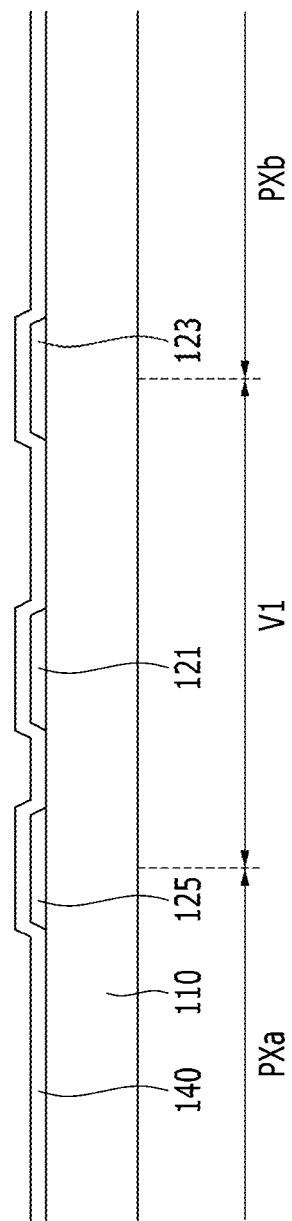
FIGS. 13, 14, 15, 16, 17, 18, 19, 20, 21, 22, 23, 24, 25, 26, 27, 28, 29, 30, 31 and 32 are process cross-sectional views of a manufacturing method of a liquid crystal display according to an exemplary embodiment of the present inventive concept.
Figure 14:
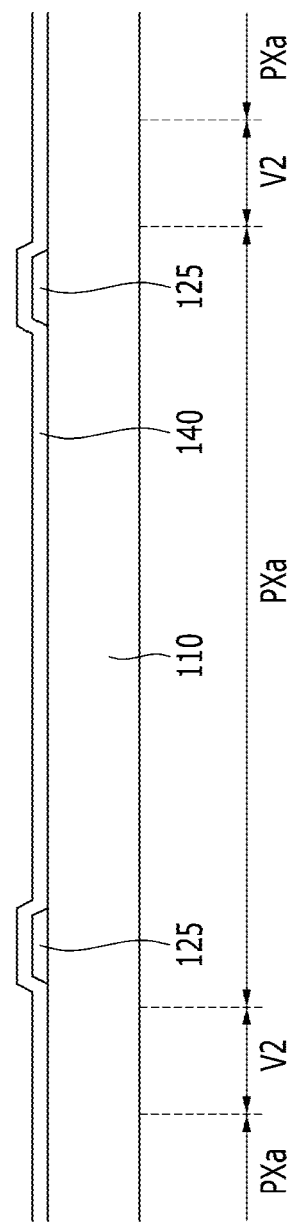

First, referring to FIG. 13 and FIG. 14, a gate line 121 and a step-down gate line 123 extending in one direction are formed on a substrate 110 made of glass or plastic, and a first gate electrode 124h, a second gate electrode 124l, and a third gate electrode 124c which protrude from the gate line 121 are formed on the substrate 110.

Further, the storage electrode line 125 may be formed together therewith so as to be spaced apart from the gate line 121, the step-down gate line 123, and the first to third gate electrodes 124h, 124l, and 124c.

Next, a gate insulating layer 140 is formed on the entire surface of the substrate 110 including the gate line 121, the step-down gate line 123, the first to third gate electrodes 124h, 124l, and 124c, and the storage electrode line 125 by using an inorganic insulating material such as a silicon oxide (SiOx) or a silicon nitride (SiNx). The gate insulating layer 140 may be formed of a single layer or a multi-layer.

Next, a first semiconductor 154h, a second semiconductor 154l, and a third semiconductor 154c are formed on the gate insulating layer 140 by depositing a semiconductor material such as amorphous silicon, polycrystalline silicon, and a metal oxide semiconductor and then patterning the deposited semiconductor material. The first semiconductor 154h may be disposed on the first gate electrode 124h, the second semiconductor 154l may be disposed on the second gate electrode 124l, and the third semiconductor 154c may be disposed on the third gate electrode 124c.

Figure 15:
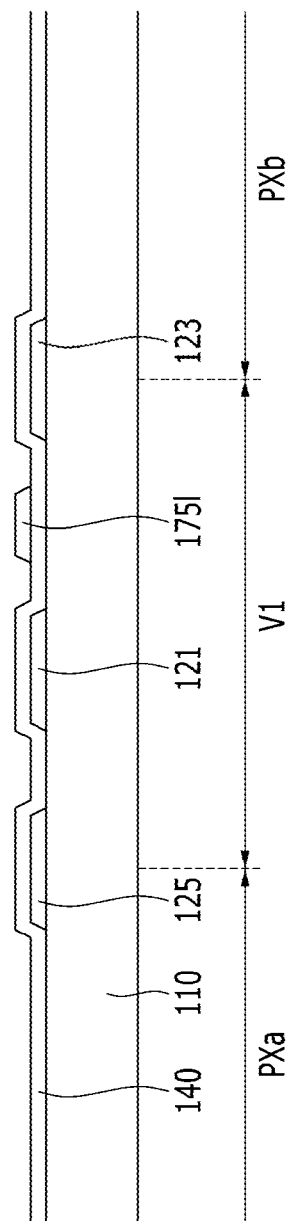
Figure 16:
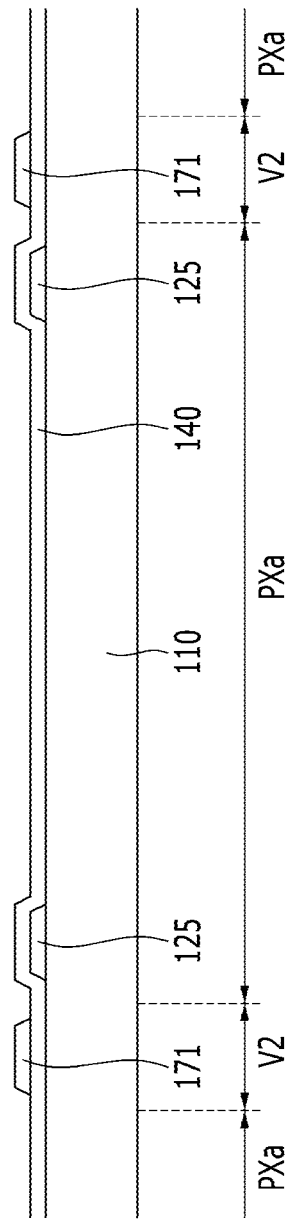

As illustrated in FIG. 15 and FIG. 13, a data line 171 extending in the other direction is formed by depositing a metallic material and then patterning the deposited metallic material. The metallic material may be formed of a single layer or a multi-layer.

Further, a first source electrode 173h protruding above the first gate electrode 124h from the data line 171 and a first drain electrode 175h spaced apart from the first source electrode 173h are formed together. Further, a second source electrode 173l connected with the first source electrode 173h and a second drain electrode 175l spaced apart from the second source electrode 173l are formed together. Further, a third source electrode 173c extends from the second drain electrode 175l and a third drain electrode 175c spaced apart from the third source electrode 173c are formed together.

The first to third semiconductors 154h, 154l, and 154c, the data line 171, the first to third source electrodes 173h, 173l, and 173c, and the first to third drain electrodes 175h, 175l, and 175c may be formed by sequentially depositing the semiconductor material and the metallic material and then patterning the semiconductor material and the metallic material at the same time. In this case, the first semiconductor 154h may extend to the lower portion of the data line 171.

The first/second/third gate electrodes 124h/124l/124c, the first/second/third source electrodes 173h/173l/173c, and the first/second/third drain electrodes 175h/175l/175c form first/second/third thin film transistors (TFTs) Qh/Ql/Qc together with the first/second/third semiconductors 154h/154l/154c, respectively.

Figure 17:
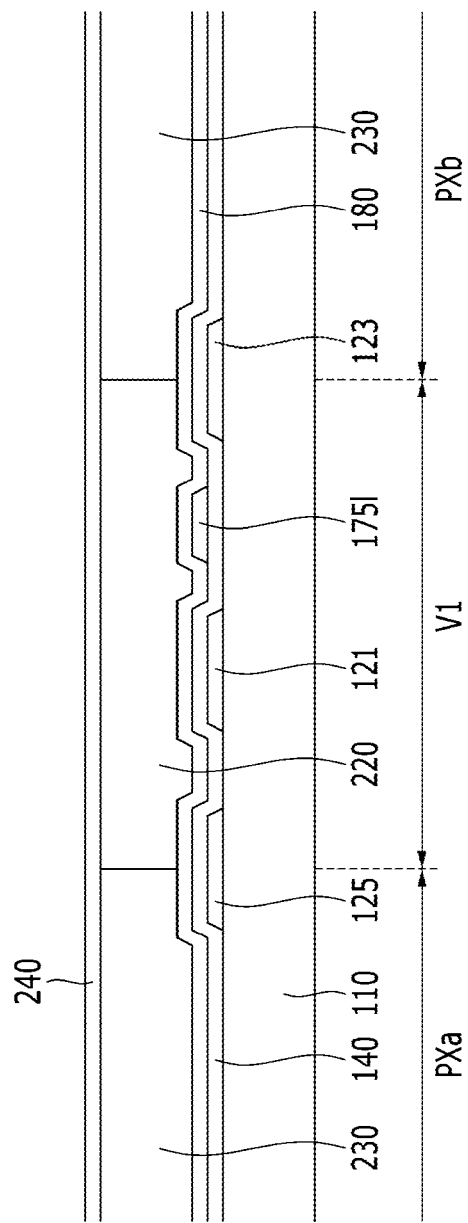
Figure 18:
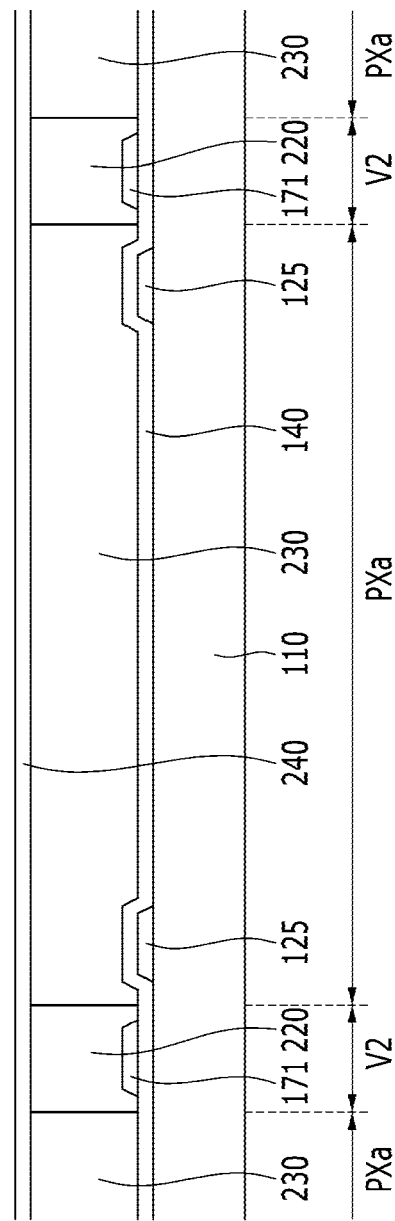

As illustrated in FIG. 17 and FIG. 18, a passivation layer 180 is formed on the data line 171, the first to third source electrodes 173*h*, 173*l*, and 173*c*, the first to third drain electrodes 175*h*, 175*l* and 175*c*, and the semiconductors 154*h*, 154*l*, and 154*c* exposed between the respective source electrodes 173*h*/173*l*/173*c* and the respective drain electrodes 175*h*/175*l*/175*c*. The passivation layer 180 may be made of an organic insulating material or an inorganic insulating material, and may be formed of a single layer or a multi-layer.

Next, a color filter 230 is formed in each pixel area PX on the passivation layer 180. The color filters 230 having the same color may be formed in a column direction of the plurality of pixel areas PXs. In the case of forming the color filters 230 having three colors, a first colored color filter 230 may be first formed and then a second colored color filter 230 may be formed by shifting a mask. After forming the second colored color filter 230, a third colored color filter may be formed by shifting the mask.

Next, a light blocking member 220 is formed on a boundary of each pixel area PX on the passivation layer 180 and the thin film transistor.

Hereinabove, the light blocking member 220 is formed after forming the color filters 230, but the present inventive concept is not limited thereto, and the light blocking member 220 may be first formed and then the color filters may be formed.

Next, a first insulating layer 240 made of an inorganic insulating material such as a silicon nitride (SiNx) and a silicon oxide (SiOx) is formed on the color filter 230 and the light blocking member 220.

Next, by etching the passivation layer 180, the light blocking member 220, and the first insulating layer 240, a first contact hole 185*h* is formed so as to expose a part of the first drain electrode 175*h*, and a second contact hole 185*l* is formed so as to expose a part of the second drain electrode 175*l*.

Figure 19:
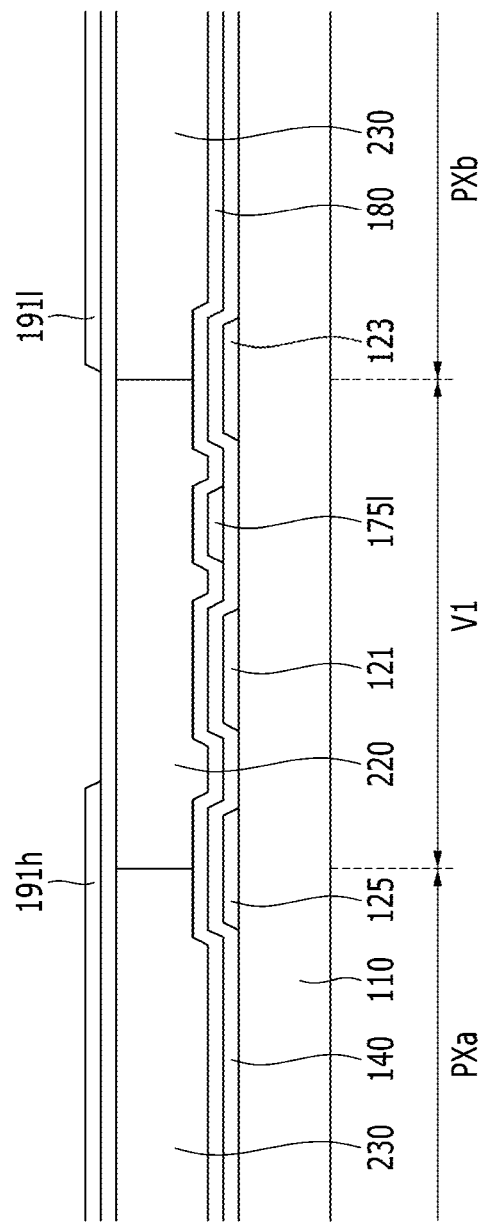
Figure 20:
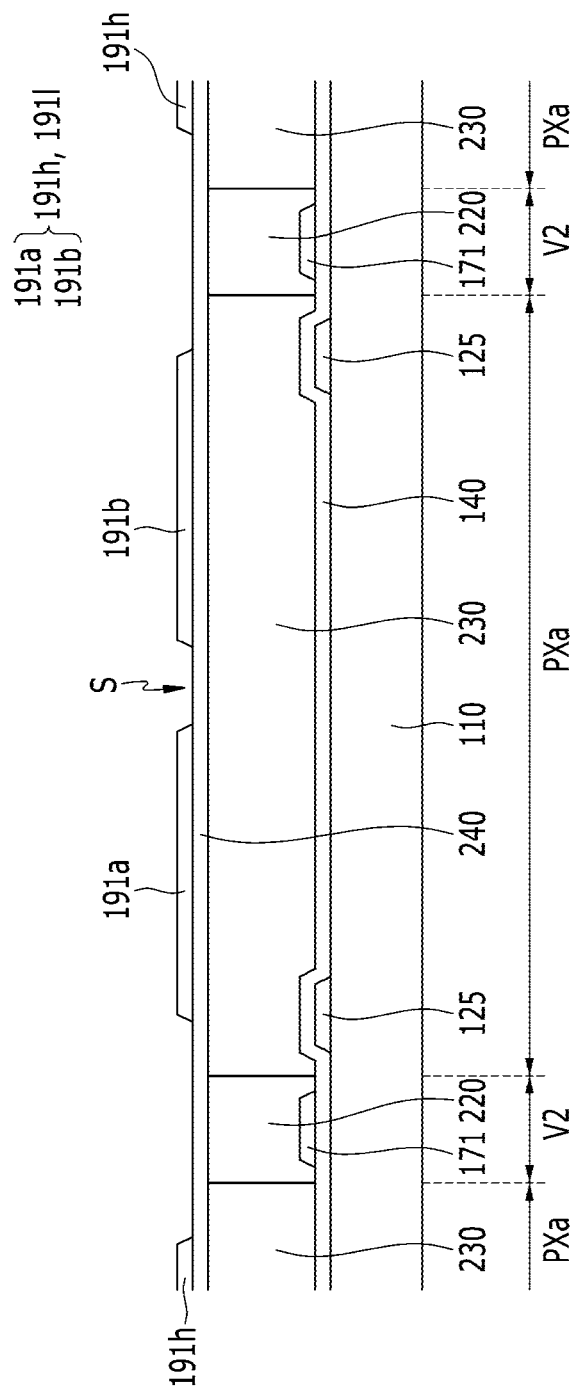

As shown in FIG. 19 and FIG. 20, a first subpixel electrode 191*h* is formed in a first subpixel area PXa and a second subpixel electrode 191*l* is formed in a second subpixel area PXb by depositing and patterning a transparent metal material such as indium tin oxide (ITO) and indium zinc oxide (IZO) on the first insulating layer 240. The first subpixel electrode 191*h* is connected with the first drain electrode 175*h* through the first contact hole 185*h*, and the second subpixel electrode 191*l* is connected with the second drain electrode 175*l* through the second contact hole 185*l*.

Also, the slit S is respectively formed at the first sub-pixel electrode 191*h* and the second sub-pixel electrode 191*l*.

The slit S is formed in the direction parallel to the data line 171 at the center of the first sub-pixel electrode 191*h* and the second sub-pixel electrode 191*l*. The slit S may have zigzag shape as already described above with respect to FIG. 11. At this time, the width W of the slit S may be formed with the range of about 1 μm to about 11 μm.

That is, the first sub-pixel electrode 191*h* and the second sub-pixel electrode 191*l* may respectively include the first electrode 191*a* and the second electrode 191*b* at the right side and left side with respect to the slit S.

Figure 21:
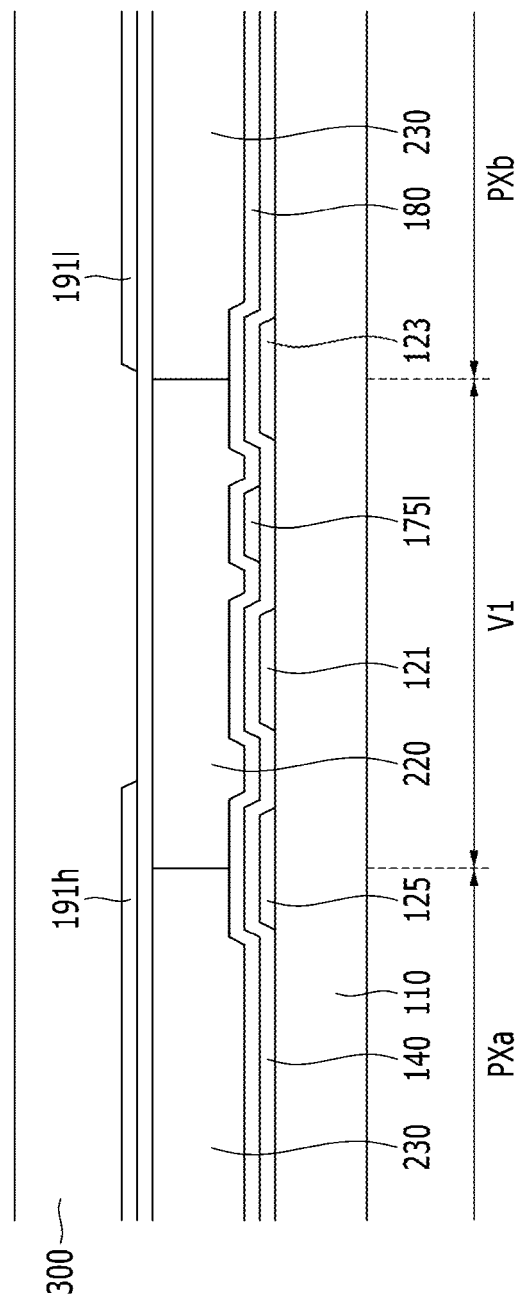
Figure 22:
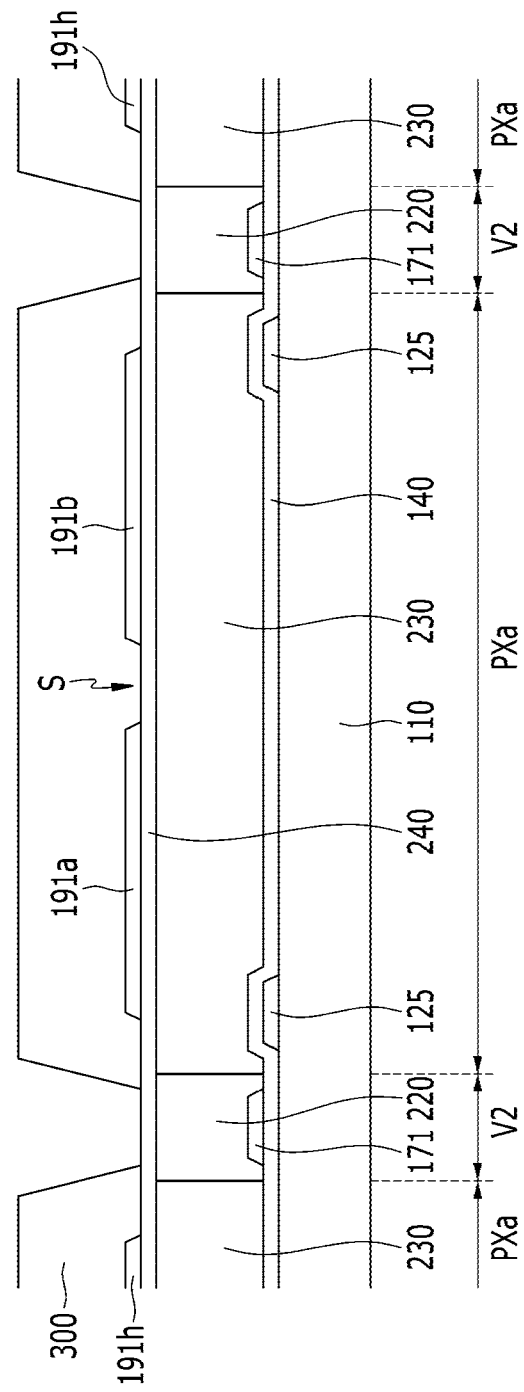

As illustrated in FIG. 21 and FIG. 22, a sacrificial layer 300 is formed by coating a photosensitive organic material on the pixel electrode 191 and through a photolithography process. The sacrificial layer 300 may be made of a positive photosensitive material.

The sacrificial layers 300 are formed to be connected along a plurality of pixel columns. That is, the sacrificial layer 300 is formed to cover each pixel area PX and to cover the first valley V1 positioned between the first subpixel area PXa and the second subpixel area PXb.

In this case, edges of the sacrificial layer 300 may be formed to be inclined in the predetermined angle with respect to the first insulating layer 240.

Figure 23:
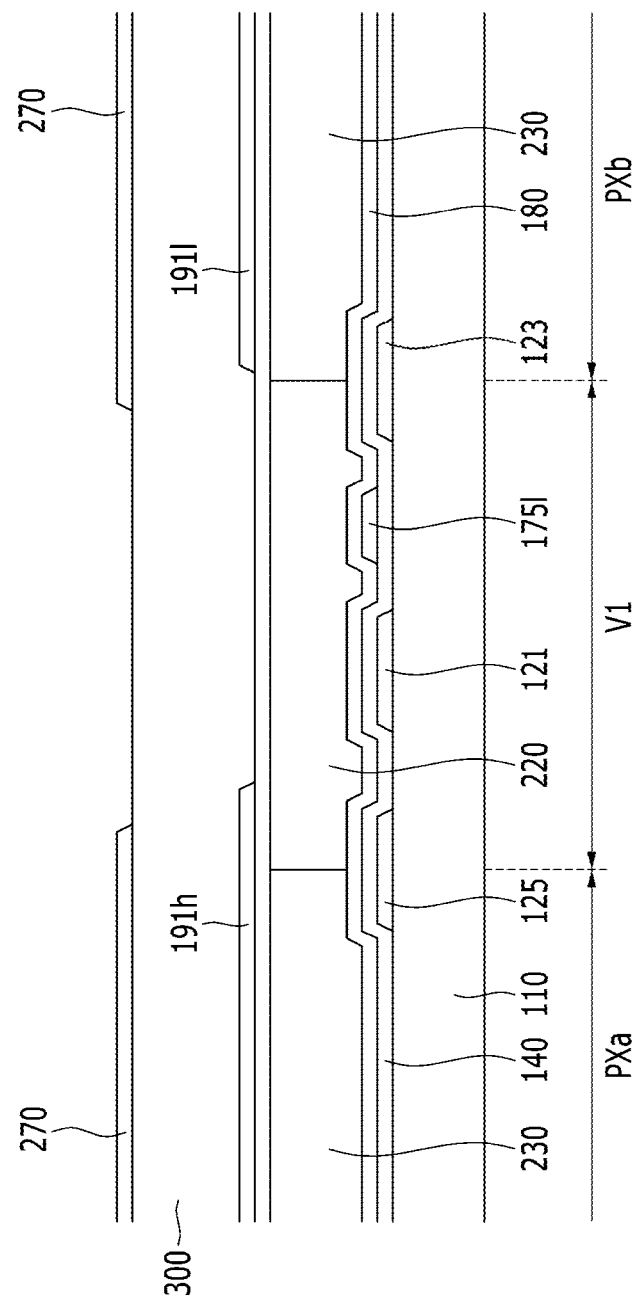
Figure 24:
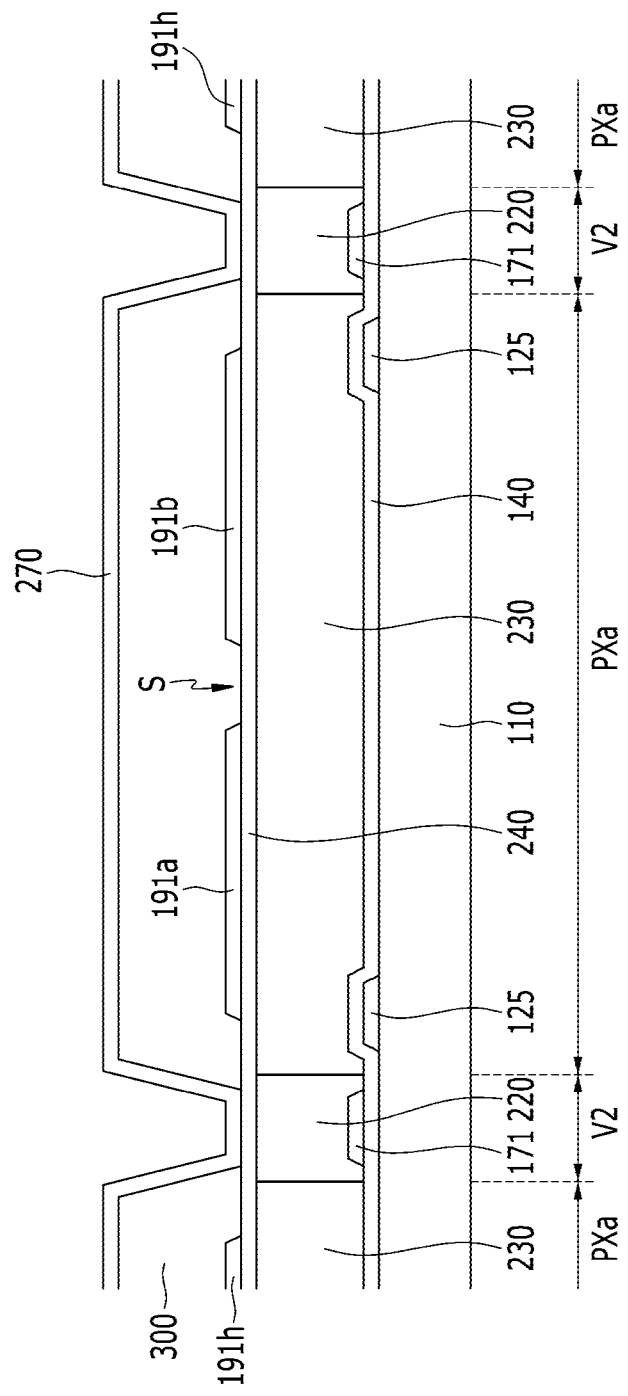

As illustrated in FIG. 23 and FIG. 24, a common electrode 270 is formed by depositing a transparent metal material such as indium tin oxide (ITO) and indium zinc oxide (IZO) on the sacrificial layer 300.

The common electrode 270 is substantially formed to cover each pixel area PX and to cover the second valley V2 positioned between the adjacent pixel areas PXs.

In this case, the common electrode 270 may be formed of plate shape electrodes parallel to the gate line 121 to cover an upper side, a right side and a left side of the microcavities 305, and a connection portion connecting the adjacent plate shape common electrodes with each other.

Figure 25:
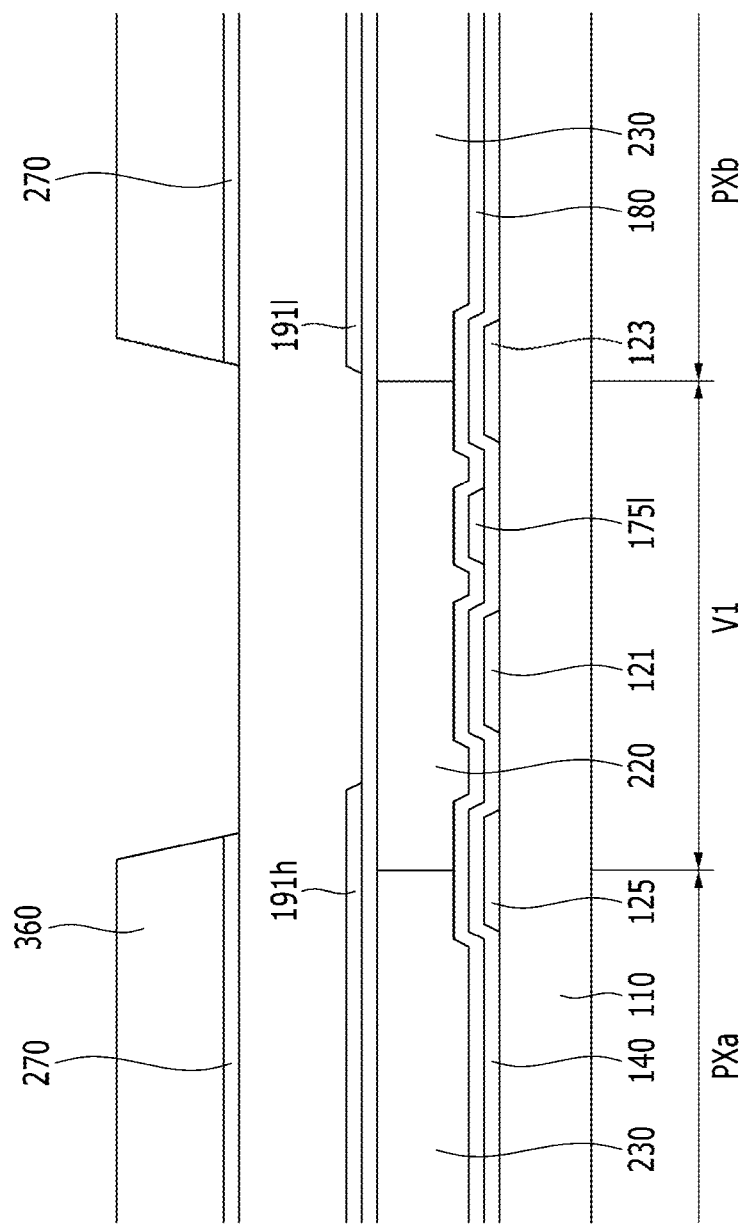
Figure 26:
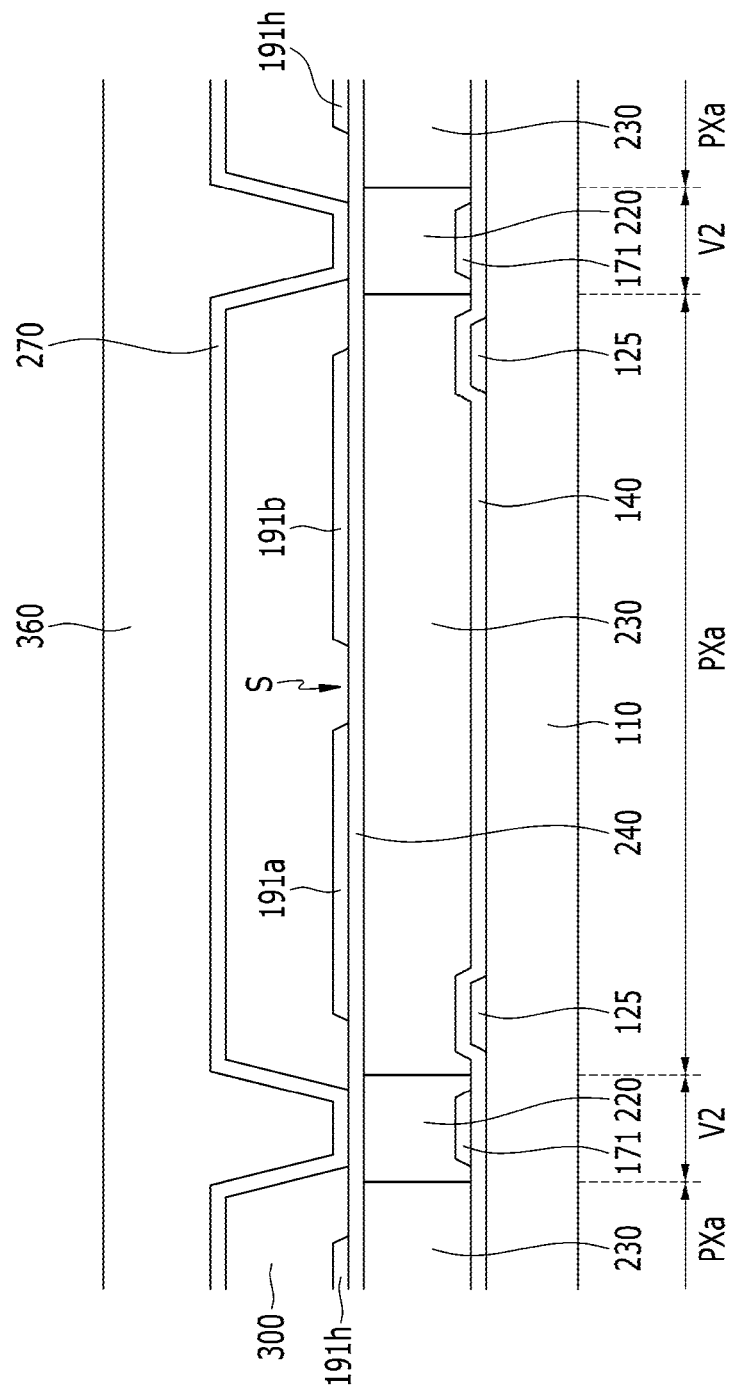

As shown in FIG. 25 and FIG. 26, the roof layer 360 made of the organic material is formed on the common electrode 270.

The roof layer 360 may be patterned to remove the roof layer 360 positioned on the first valley V1.

In this case, the roof layer 360 forms the oblique portion E inclined with the predetermined angle at the outside positioned at the second valley V2. The oblique angle of the oblique portion E may be formed with the range of about 10 degrees to about 80 degrees.

Figure 27:
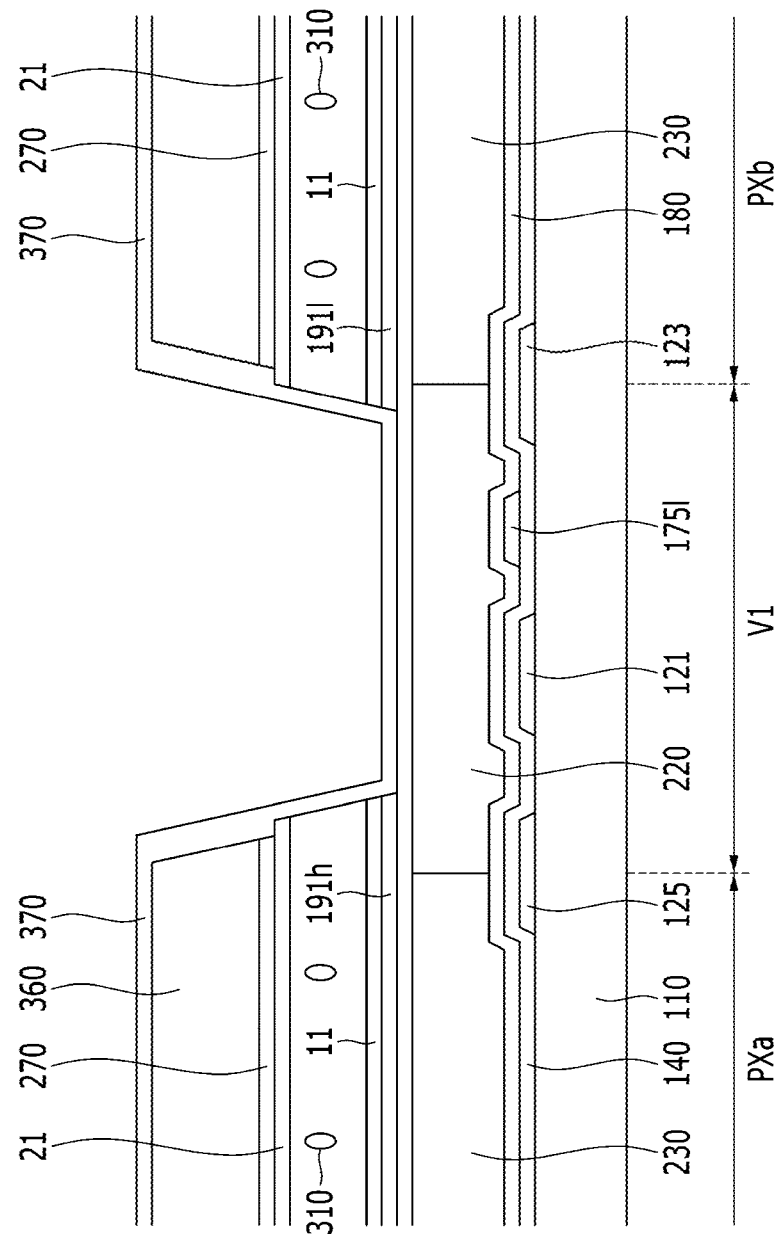
Figure 28:
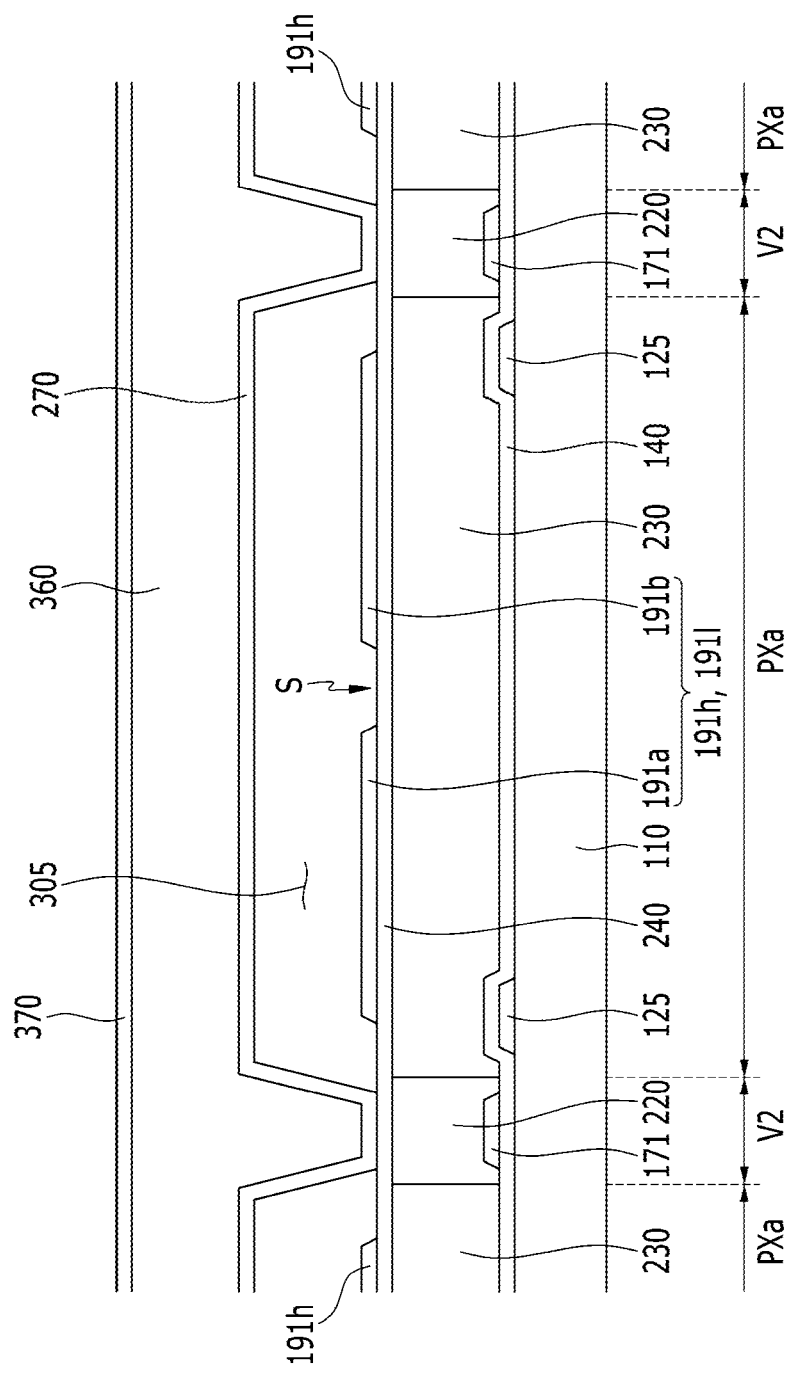

As shown in FIG. 27 and FIG. 28, the second insulating layer 370 made of the inorganic insulating material such as a silicon nitride (SiNx) or a silicon oxide (SiOx) may be formed on the roof layer 360. The second insulating layer 370 is formed on the patterned roof layer 360, thereby covering and protecting the side of the roof layer 360, that is, the oblique portion E.

Figure 29:
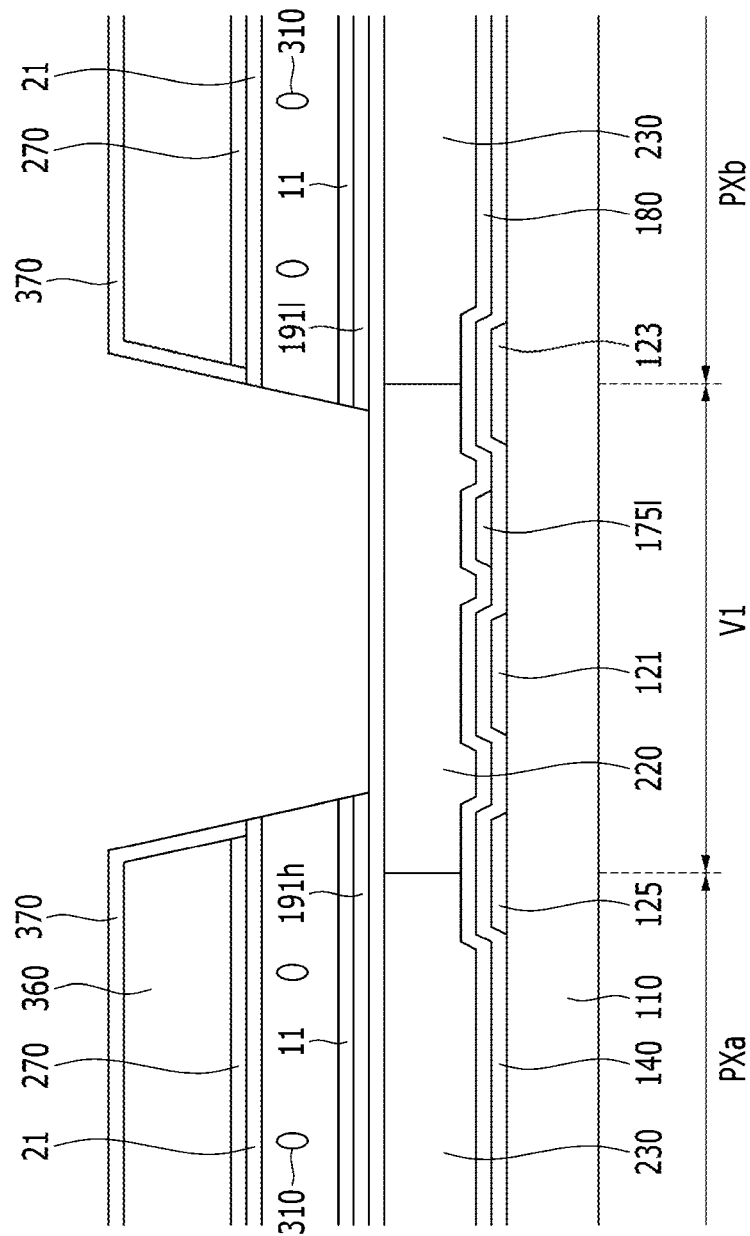
Figure 30:
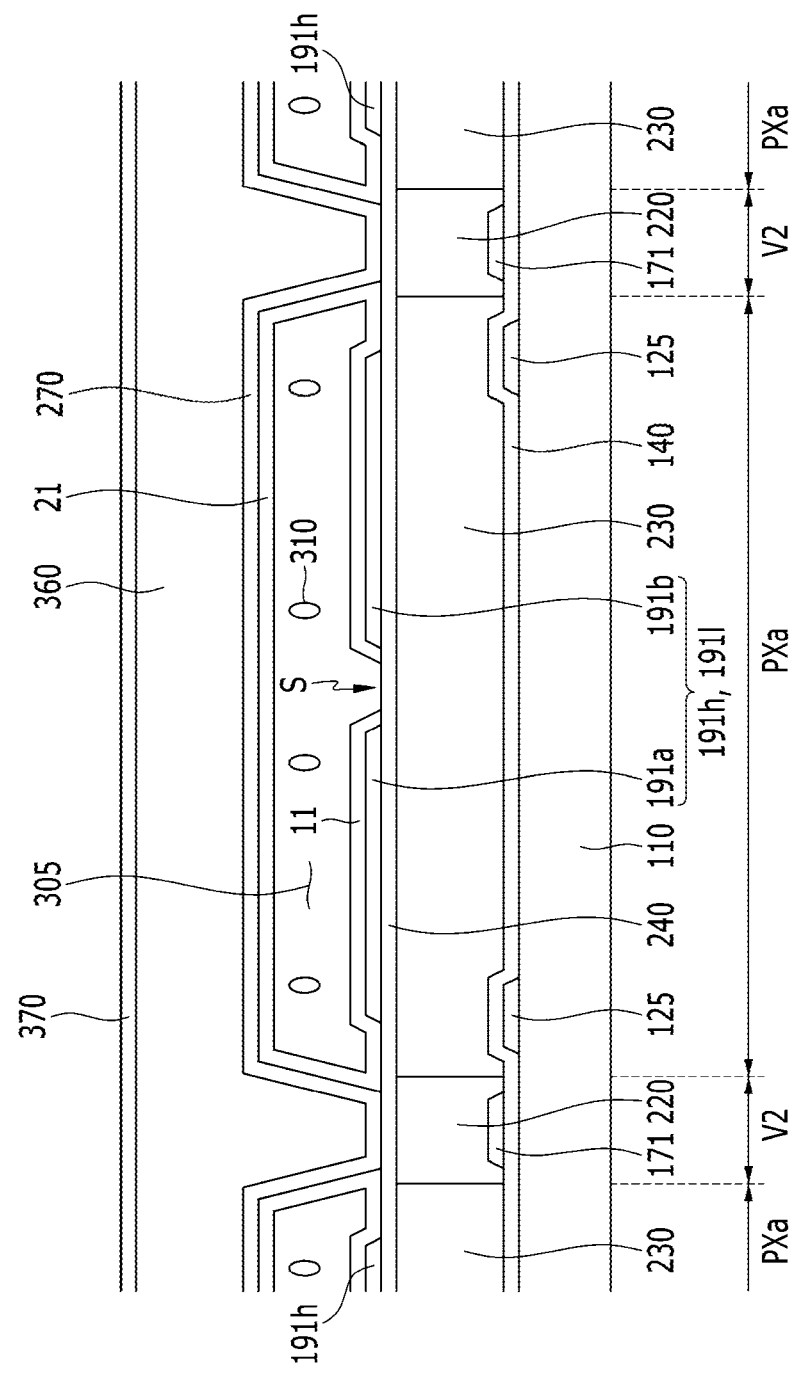

As shown in FIG. 29 and FIG. 30, the second insulating layer 370 is patterned to remove the second insulating layer 370 positioned on the first valley V1.

The second insulating layer 370 is patterned such that the sacrificial layer 300 positioned at the first valley V1 is exposed.

The sacrificial layer 300 is fully removed by supplying a stripper solution on the substrate 110 where the sacrificial layer 300 is exposed, or the sacrificial layer 300 is fully removed by an ashing process. If the sacrificial layer 300 is removed, the microcavities 305 are generated at the position in which the sacrificial layer 300 is positioned.

The pixel electrode 191 and the common electrode 270 are spaced apart from each other with the microcavity 305 interposed therebetween, and the pixel electrode 191 and the roof layer 360 are spaced apart from each other with the microcavity 305 interposed therebetween. The common electrode 270 and the roof layer 360 are formed to cover the upper side and both sides of the microcavity 360.

Further, the microcavity 360 is exposed outside through a portion where the roof layer 360 and the common electrode 270 are removed, which is called the liquid crystal injection hole 307. The liquid crystal injection hole 307 is formed along the first valley V1.

Next, the roof layer 360 is cured by applying heat to the substrate 110. The shape of the microcavity 305 is maintained by the roof layer 360.

Next, when an aligning agent containing an alignment material is formed on the substrate 110 by a spin coating method or an inkjet method, the aligning agent is injected into the microcavity 305 through the liquid crystal injection hole 307. When the aligning agent is injected into the microcavity 305 and then a curing process is performed, a solution in the aligning agent is evaporated and the alignment material remains on the inner wall of the microcavity 305.

Accordingly, the first alignment layer 11 may be formed on the pixel electrode 191, and the second alignment layer 21 may be formed below the common electrode 270. The first alignment layer 11 and the second alignment layer 21 face each other with the microcavity 305 therebetween and are connected to each other at the edge of the pixel area PX.

In this case, the first and second alignment layers 11 and 21 may be aligned in a vertical direction with respect to the substrate 110 except at the side of the microcavity 305. In addition, a process of irradiating UV light to the first and second alignment layers 11 and 21 may be performed to align the first and second alignment layers 11 and 21 in a horizontal direction with respect to the substrate 110.

Next, when the liquid crystal material including the liquid crystal molecules 310 is formed on the substrate 110 by an inkjet method or a dispensing method, the liquid crystal material is injected into the microcavity 305 through the liquid crystal injection hole 307. In this case, the liquid crystal material may be provided in the liquid crystal injection holes 307 formed along the odd-numbered first valleys V1 but may not be provided in the liquid crystal injection holes 307 formed along the even-numbered first valleys V1. On the contrary, the liquid crystal material may be provided in the liquid crystal injection holes 307 formed along the even-numbered first valleys V1 but may not be provided in the liquid crystal injection holes 307 formed along the odd-numbered first valleys V1.

When the liquid crystal material is formed in the liquid crystal injection hole 307 formed along the odd-numbered first valleys V1, the liquid crystal material is injected into the micro cavities 306 from the liquid crystal injection holes 307 by capillary force. In this case, the liquid crystal material is injected into the microcavities 305 well by discharging air from the microcavities 305 through the liquid crystal injection holes 307 formed along the even-numbered first valleys V1.

Further, the liquid crystal material may be dropped in all the liquid crystal injection holes 307. That is, the liquid crystal material may be formed in the liquid crystal injection holes 307 formed along the odd-numbered first valleys V1 and the liquid crystal injection holes 307 formed along the even-numbered first valleys V1.

Figure 31:
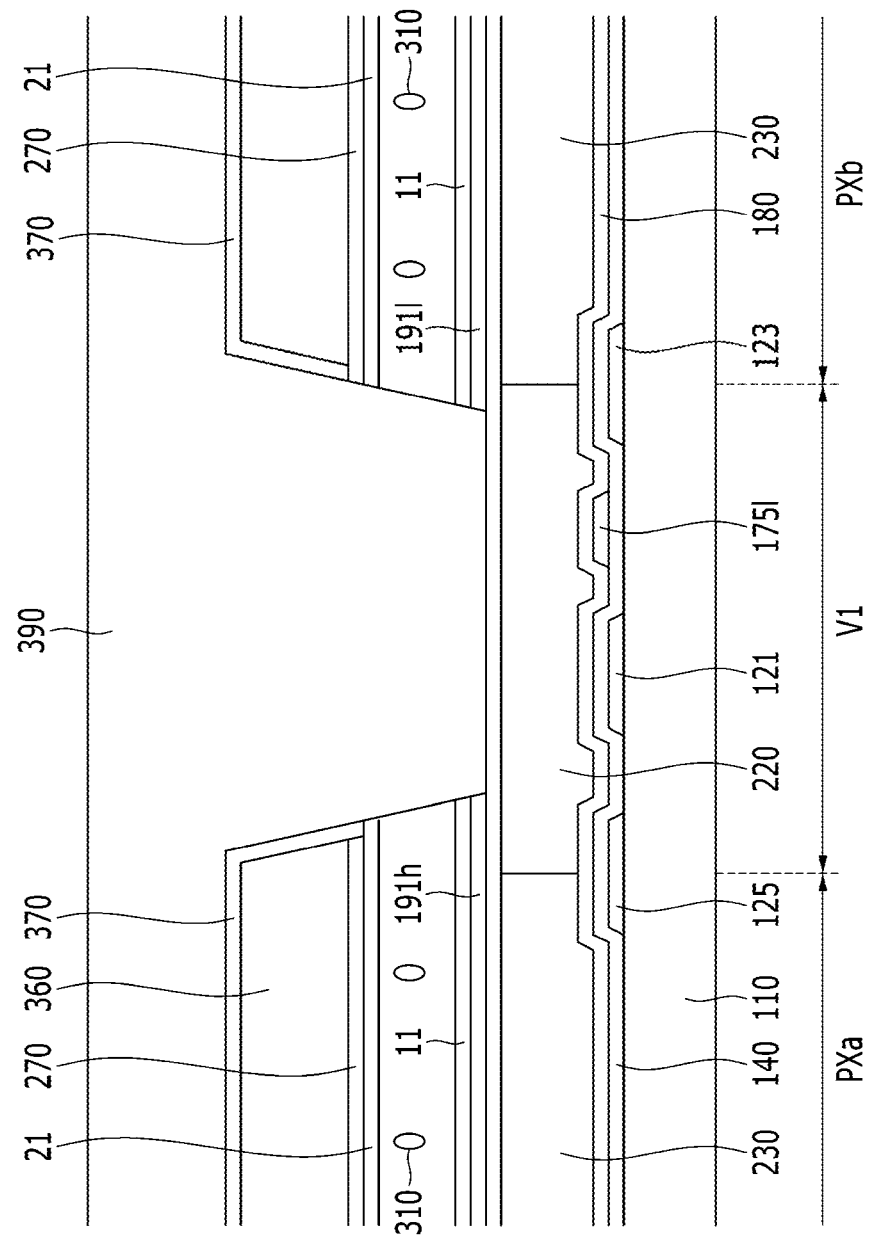
Figure 32:
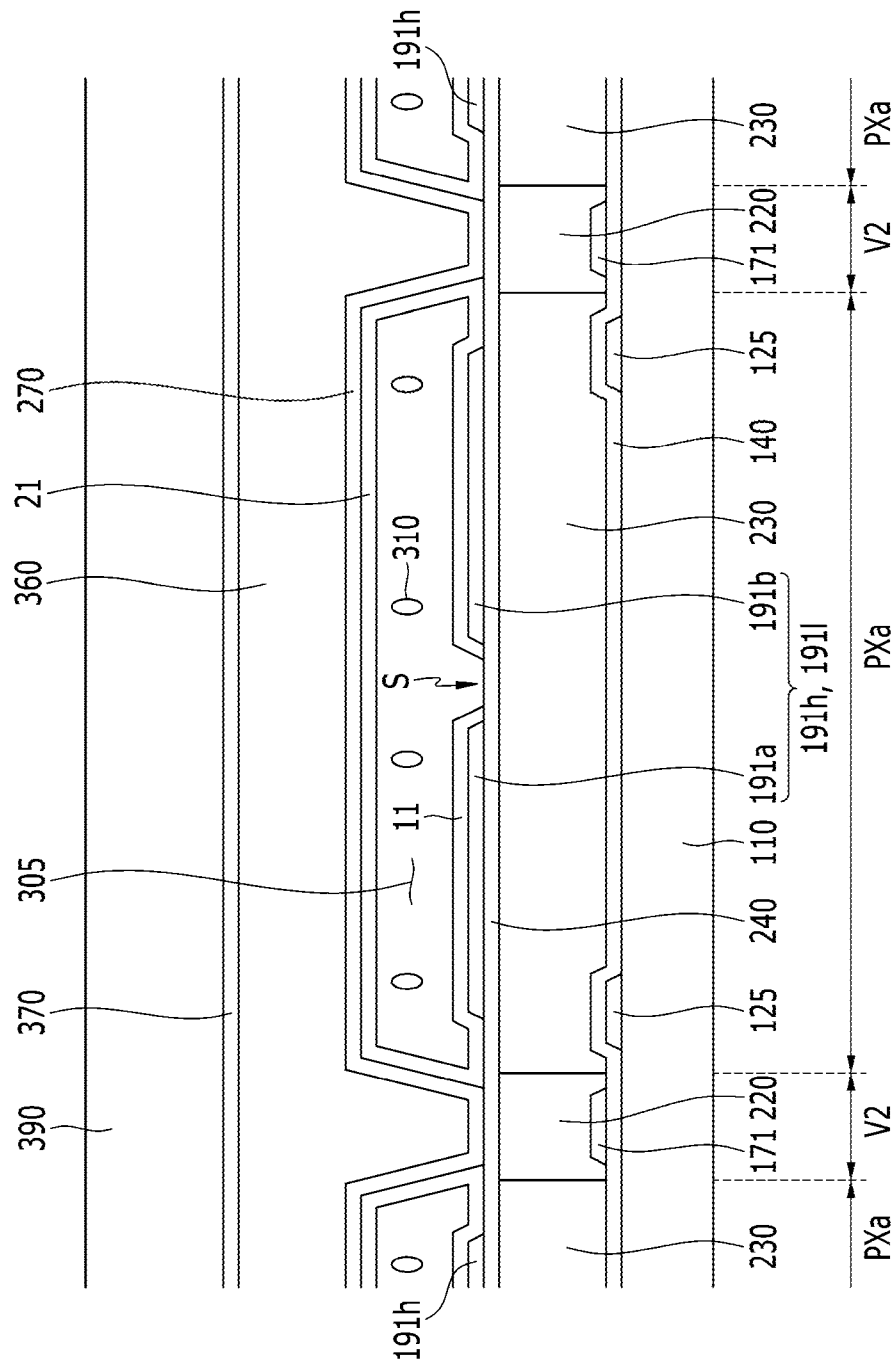

As illustrated in FIG. 31 and FIG. 32, an overcoat layer 390 is formed by forming a material which does not react with the liquid crystal molecules 310 on the second insulating layer 370. The overcoat 390 is formed to cover the liquid crystal injection holes 307 where the microcavity 305 is exposed outside to seal the microcavities 305.

Next, although not illustrated, polarizers may be further attached onto the upper and lower sides of the display device. The polarizers may be configured by a first polarizer and a second polarizer. The first polarizer may be attached onto the lower side of the substrate 110, and the second polarizer may be attached onto the overcoat 390.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A liquid crystal display comprising:
   a substrate;
   a gate line and a data line crossing each other formed on the substrate;
   a thin film transistor connected to the gate line and the data line;
   a pixel electrode connected to the thin film transistor and having a slit at a center;
   a liquid crystal layer filling a plurality of microcavities positioned on the pixel electrode;
   a common electrode positioned on the liquid crystal layer; and
   a roof layer formed on the common electrode and having an oblique portion formed to be inclined at both sides of the microcavities,
   wherein the roof layer is formed to cover up right and left sides of the microcavities in a cross-sectional view cutting along a line substantially perpendicular to the data line.

2. The liquid crystal display of claim 1, wherein
   an oblique angle of the oblique portion is formed in a range of about 10 degrees to about 80 degrees.

3. The liquid crystal display of claim 1, wherein
   a width of the slit is formed of a range of about 1 μm to about 11 μm.

4. The liquid crystal display of claim 1, wherein
   a width of the slit is formed of a range of about 5 μm to about 9 μm.

5. The liquid crystal display of claim 1, wherein
   the common electrode is formed of a plate shape parallel to the gate line to cover the right and left sides of the microcavities.

6. The liquid crystal display of claim 1, wherein
   the pixel electrode includes a first electrode and a second electrode positioned at a right side and a left side with respect to the slit.

7. The liquid crystal display of claim 6, wherein
   the first electrode and the second electrode extend in a direction in which the data line extends.

8. The liquid crystal display of claim 6, wherein
   the first electrode and the second electrode are connected to each other.

9. The liquid crystal display of claim 8, wherein
   the first electrode and the second electrode are formed to be connected at one side or both sides of the pixel electrode.

10. The liquid crystal display of claim 1, wherein
    the pixel electrode includes a first electrode and a second electrode respectively positioned at a left side and a right side with respect to the slit, and
    the first and second electrodes include a first region extending in a direction from a lower left toward an upper right and a second region extending in a direction from an upper left toward a lower right.

* * * * *